US011184749B2

(12) United States Patent
Na et al.

(10) Patent No.: US 11,184,749 B2
(45) Date of Patent: Nov. 23, 2021

(54) METHOD AND APPARATUS FOR SENSOR REPLACEMENT IN SYSTEM

(71) Applicants: Hyundai Motor Company, Seoul (KR); Kia Motors Corporation, Seoul (KR)

(72) Inventors: Young Jin Na, Gyeonggi-do (KR); Joon Young Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 226 days.

(21) Appl. No.: 16/208,067

(22) Filed: Dec. 3, 2018

(65) Prior Publication Data

US 2019/0197797 A1 Jun. 27, 2019

(30) Foreign Application Priority Data

Dec. 4, 2017 (KR) .................. 10-2017-0165488
Sep. 6, 2018 (KR) .................. 10-2018-0106578

(51) Int. Cl.
*G07C 5/00* (2006.01)
*G07C 5/08* (2006.01)
*H04W 4/46* (2018.01)
*H04W 4/44* (2018.01)
*H04L 29/08* (2006.01)
*H04W 4/70* (2018.01)

(52) U.S. Cl.
CPC .............. *H04W 4/44* (2018.02); *G07C 5/008* (2013.01); *H04L 67/12* (2013.01); *H04W 4/46* (2018.02); *G07C 5/0808* (2013.01); *H04W 4/70* (2018.02)

(58) Field of Classification Search
CPC ............ B60W 50/02; B60W 50/0205; B60W 2050/021; B60W 2050/0215; B60W 2050/008; G07C 5/0816; B60R 2021/0112; B60R 2021/01129; B60R 2021/01184; G08G 1/20; G08G 1/22
See application file for complete search history.

(56) References Cited

U.S. PATENT DOCUMENTS

| 8,554,746 | B2* | 10/2013 | Weinberger ........... G06F 16/278 707/693 |
| 2008/0077290 | A1* | 3/2008 | Weinmann ............... G08G 1/20 701/33.4 |
| 2009/0140872 | A1* | 6/2009 | O'Neal ..................... G05B 9/03 340/679 |
| 2014/0129060 | A1* | 5/2014 | Cooper ................ G05D 1/0295 701/19 |
| 2017/0067764 | A1* | 3/2017 | Skupin ................... G07C 5/008 |
| 2017/0166219 | A1* | 6/2017 | Jammoussi ............ G08G 1/048 |

(Continued)

*Primary Examiner* — Thomas G Black
*Assistant Examiner* — Sara J Lewandroski
(74) *Attorney, Agent, or Firm* — Mintz Levin Cohn Ferris Glovsky and Popeo, P.C.; Peter F. Corless

(57) ABSTRACT

The present invention may provide a method of managing, by a vehicle, a sensor. Herein, a method of managing, by a vehicle, a sensor may include: monitoring state information of a first sensor of a first vehicle; when the first sensor is abnormal, determining whether or not a second sensor performs the function of the first sensor; when the second sensor performs the function of the first sensor, reporting information representing that second sensor performs the function of the first sensor; and receiving sensing data from the second sensor.

7 Claims, 16 Drawing Sheets

(56) References Cited

U.S. PATENT DOCUMENTS

| | | | |
|---|---|---|---|
| 2018/0143298 A1* | 5/2018 | Newman | B60R 11/04 |
| 2018/0186468 A1* | 7/2018 | Songa | G01S 7/003 |
| 2018/0237006 A1* | 8/2018 | Ishii | B60W 50/0225 |
| 2019/0073908 A1* | 3/2019 | Neubecker | G08G 1/096725 |
| 2019/0164267 A1* | 5/2019 | Oe | G06K 9/00825 |
| 2020/0114930 A1* | 4/2020 | Syafril | G07C 5/008 |

* cited by examiner

METHOD AND APPARATUS FOR SENSOR REPLACEMENT IN SYSTEM

CROSS REFERENCE TO RELATED APPLICATION

The present application claims priority to Korean Patent Application Nos. 10-2017-0165488, and 10-2018-0106578, filed Dec. 4, 2017, and Sep. 6, 2018, respectively, the entire contents of which is incorporated herein for all purposes by this reference.

BACKGROUND OF THE INVENTION

Field of the Invention

The present invention relates to a method and apparatus for taking over a sensor function in a system. More particularly, the present invention relates to a method and apparatus for taking over a sensor function in a transportation safety system using IoT (Internet of Things) by taking into account a sensor failure.

Description of the Related Art

Recently, using of an M2M (machine-to-machine) system has become active. M2M communication refers to communication performed between machines without intervention of a person. M2M may refer to MTC (machine type communication), IoT (Internet of Things) or D2D (device-to-device). However, in below, for convenience of description, it may be referred as M2M in a unified manner, but it is not limited thereto. A terminal used in M2M communication may be an M2M terminal (M2M device). An M2M terminal may be a device generally transmitting a small amount of data and having low mobility. Herein, an M2M terminal may be used by being connected to an M2M server storing and managing communication information between machines in the management center.

In addition, an M2M terminal may be applied to various systems such as tracking, automobile interlocking, metering, etc.

Meanwhile, a method of providing a service related to an M2M terminal is provided from various standardization organizations.

SUMMARY OF THE INVENTION

An objective of the present invention is to provide a method of enabling a function of a malfunctioning sensor to be taken over by another sensor in a system when a sensor malfunctions.

Another objective of the present invention is to provide a method of performing a sensor operation in a system by using a sensor of an adjacent terminal (or adjacent vehicle).

Still another objective of the present invention is to provide a method of managing a sensor.

According to an embodiment of the present invention, there is provided a method of managing, by a vehicle, in a system. Herein, a method of managing, by a vehicle, a sensor, includes: monitoring state information of a first sensor of a first vehicle; when the first sensor is abnormal, determining whether or not to a second sensor performs the function of the first sensor; when the second sensor performs the function of the first sensor, reporting information representing that the second sensor performs the function of the first sensor; and receiving sensing data from the second sensor.

According to an embodiment of the present invention, there is provided a vehicle managing a sensor in a system. Herein, a vehicle managing a sensor in a system includes: a transceiver transmitting and receiving a signal; and a processor controlling the transceiver. Herein, the processor: monitors state information of a first sensor of a first vehicle; when the first sensor is abnormal, determines whether or not to a second sensor performs the function of the first sensor; when the second sensor performs the function of the first sensor, reports information representing that the second sensor performs the function of the first sensor; and receives sensing data from the second sensor.

In addition, for the method and vehicle for managing sensor in the system, the following features may be commonly applied.

According to an embodiment of the present invention, the second sensor may be located in any one of the first vehicle or a second vehicle.

According to an embodiment of the present invention, the second vehicle may include a capability of performing vehicle-to-vehicle (V2V) communication with the first vehicle.

In addition, according to an embodiment of the present invention, when the second sensor is located in the second vehicle, whether or not the second sensor performs the function of the first sensor may be determined on the basis of a management server.

In addition, according to an embodiment of the present invention, the first vehicle may exchange at least one of state information of the first sensor, adjacent vehicle information, and adjacent sensor information with the management server, and whether or not the second sensor performs the function of the first sensor may be determined on the basis of the exchanged information.

In addition, according to an embodiment of the present invention, when the second sensor is located in the second vehicle, whether or not the second sensor performs the function of the first sensor may be determined on the basis of the first vehicle and the second vehicle.

In addition, according to an embodiment of the present invention, the first vehicle may exchange with the second vehicle at least one of state information of the first sensor, information whether or not the second vehicle is adjacent to the first vehicle, and adjacent sensor information, and whether or not the second sensor performs the function of the first sensor may be determined on the basis of the exchanged information.

In addition, according to an embodiment of the present invention, when the second sensor is located in the first vehicle, and the second sensor does not perform the function of the first sensor, whether or not a third sensor located in the second sensor performs the function of the first sensor may be determined.

In addition, according to an embodiment of the present invention, the information representing that the second sensor performs the function of the first sensor may be reported from a device layer of the first vehicle to a service support and application support layer of the first vehicle.

In addition, according to an embodiment of the present invention, the state information of the first sensor and information of the second vehicle may be further reported.

In addition, according to an embodiment of the present invention, when the first sensor malfunctions, or a value measured by the first sensor is equal to or smaller than a threshold value, the first sensor may be determined to be abnormal.

According to the present invention, the present invention can provide a method of enabling the function of a malfunctioning sensor to be taken over by another sensor in a system when a sensor malfunctions.

According to the present invention, there is provided a method of performing a sensor operation in a system by using a sensor of an adjacent terminal (or adjacent vehicle).

According to the present invention, there is provided a method of managing a sensor.

According to the present invention, temporal and resource efficiency can be improved by using a sensor of another vehicle even though a sensor is in a failure state.

According to the present invention, safety can be improved by replacing sensor while driving.

Technical problems obtainable from the present invention are not limited by the above-mentioned technical problems, and other unmentioned technical problems may be clearly understood from the following description by those having ordinary skill in the technical field to which the present invention pertains.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
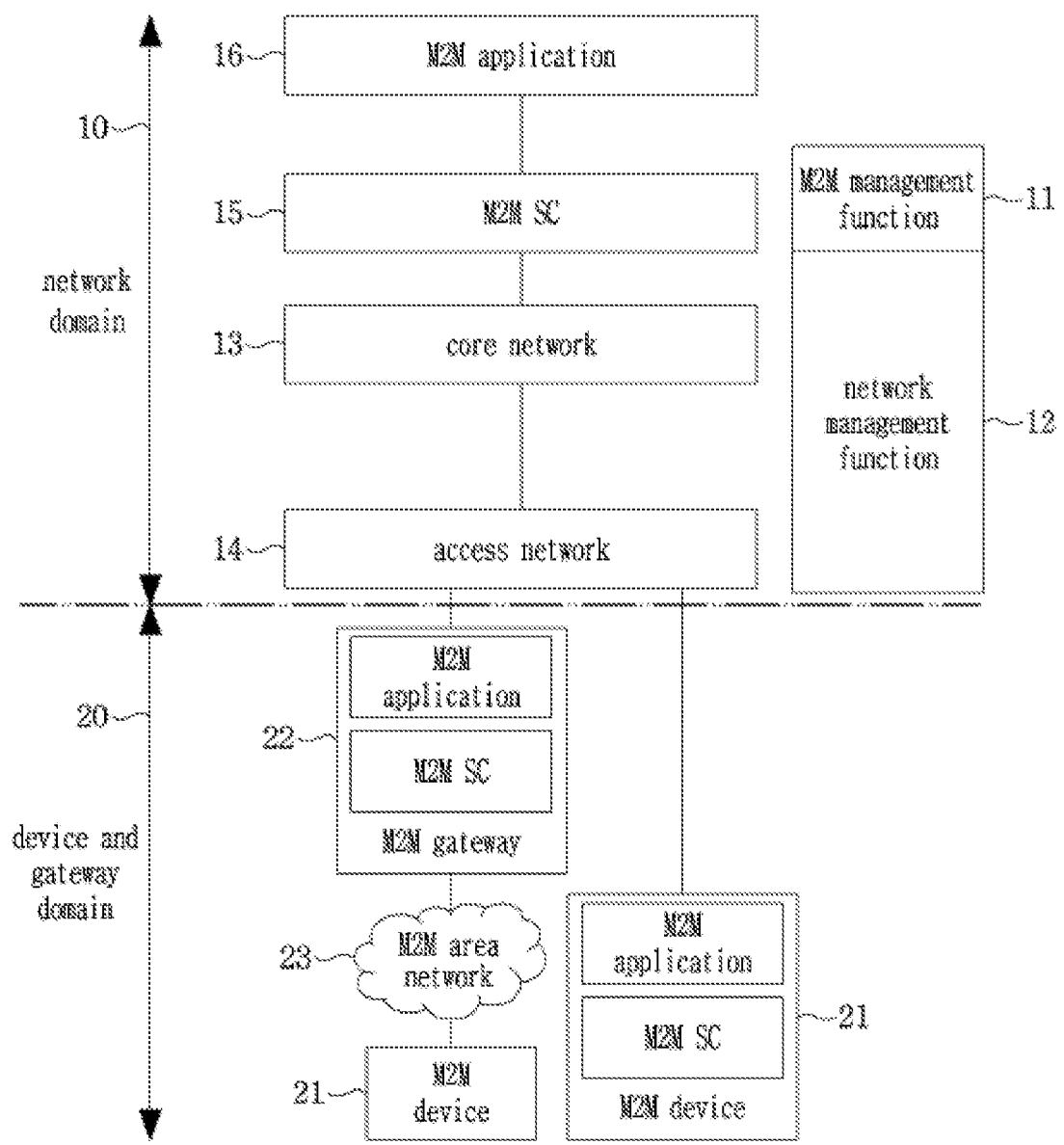
FIG. 1 is a view showing an M2M system according to an embodiment.

Hereinafter, an exemplary embodiment of the present invention will be described with reference to the accompanying drawings for those skilled in the art to easily implement the present invention. However, the present invention may be embodied in many different forms and is not limited to the embodiments described herein.

In the present invention, it will be understood that although the terms first and second are used herein to describe various elements, these elements should not be limited by these terms. Thus, within the scope of this disclosure, a first component in one embodiment may be referral as a second component in another embodiment, and similarly, a second component in one embodiment may be referred as a second component in another embodiment.

In the present invention, if a component were described as "connected", "coupled", or "inked" to another component, they may mean the components are not only directly "connected", "coupled", or "linked", but also are indirectly "connected", "coupled", or "linked" via one or more additional components. In addition, it will be understood that the terms "comprises", "comprising", or "includes" or "including" when used in this specification, specify the presence of one or more other components, but do not preclude the presence or addition of one or more other components unless defined to the contrary.

In the present invention, the components that are distinguished from each other are intended to clearly describe the respective features, and do not necessarily mean that the components are separated. That is, a plurality of components may be integrated into one hardware or software unit, or one component may be distributed into a plurality of hardware or software units. Accordingly, such integrated or distributed embodiments are included within the scope of the present invention, unless otherwise noted.

In the present invention, the components described in the various embodiments are not necessarily essential components, and some may be optional components. Accordingly, embodiments consisting of a subset of the components described in one embodiment are also included in the scope of the present invention. In addition, embodiments including other components in addition to the components described in the various embodiments are also included in the scope of the present invention.

In the following description of the at least one embodiment, a detailed description of known functions and configurations incorporated herein will be omitted for the purpose of clarity and for brevity. In addition, parts not related to the description of the present invention in the drawings are omitted, and like parts are denoted by similar reference numerals.

In addition, in an embodiment, a system in the present invention may be a system using IoT (Internet of Things), a M2M (machine to machine) using system, etc. In addition, a system to which the same operation based on the present invention is applied may be a system referred in the present invention, but it is not limited to the above-described embodiment.

In addition, the present specification describes a network based on an M2M communication, and an operation performed in an M2M communication network may be performed while a system managing the corresponding communication network controls the network and transmits data.

In addition, in the present specification, an M2M terminal may be a terminal performing M2M communication, or may be a terminal operating in a wireless communication system taking into account backward compatibility. In other words, an M2M terminal may mean a terminal operating on the basis of an M2M communication network, but it is not limited to an M2M communication network. An M2M terminal may possibly operate on the basis of another wireless communication network, but it is not limited to the above-described embodiment.

In an embodiment, a terminal used in M2M communication may be referral as an M2M device. Herein, an M2M device generally has a feature of low mobility, time tolerant or delay tolerant, small data transmission, etc., and may be used by being connected to an M2M sever centrally storing and managing communication information between machines. In addition, when an M2M device is connected to an M2M server through communication methods different from each other, at a section where a communication method is changed, an M2M device and an M2M server are connected to each other through an M2M gateway, and the entire M2M system may be configured as above. In an embodiment, on the basis of a corresponding system, traffic field services (for example, intelligent transport system (ITS), transportation safety services, etc.), tracking services, metering services, automatic payment systems, medical field services, remote control services, etc. may be provided.

In the present invention, an M2M device may be fixed or movable, and may transmit to and receive from user data or control information or both by performing communication with an M2M server. An M2M device may be referral as terminal equipment, a mobile station (MS), a mobile terminal (MT), a user terminal (UT), a subscribe station (SS), a wireless device, a personal digital assistant (PDA), a wireless modem, a handheld device, etc. In the present invention, an M2M server may be referred as a server for M2M communication, and may be implemented by using a fixed station or mobile station. An M2M server may exchange data and control information by performing communication with M2M devices or another M2M server or both. In addition, an M2M gateway may refer to a device performing a connection point function from one network to another network when a network to which an M2M device is connected and a network to which an M2M server is connected are different. In addition, an M2M gateway may perform a function of an M2M device, in addition, for example, may manage an M2M device connected to an M2M gateway, or may perform a function of message fan out by receiving one message and transmitting the same or modified message to M2M devices connected thereto, or a function of message aggregation. The term of M2M device may be used as a concept including an M2M gateway and an M2M server. Accordingly, an M2M gateway and an M2M server may be referred as an M2M device.

In addition, in the present specification, the term of "entity" may be used to refer to hardware such as an M2M device, an M2M gateway, and an M2M server, or may be used to refer to a software component of an M2M application layer and an M2M (common) service layer which will be described in below.

In below, the present invention is described on the basis of an M2M system, but the present invention is not limited in an M2M system, may be identically or similarly applied, for example, to a system according to a client-server (or sender-responder) model.

FIG. 1 is a view showing an M2M system according to an embodiment.

An M2M system defines a common M2M service framework for various M2M applications. An M2M application 10 may refer to a software component implementing an M2M service solution such as e-Health, city automation, connected consumer, and automotive. In an M2M system, in order to implement various M2M applications, functions that are commonly required may be provided, and the functions that are commonly required may be referred as an M2M service or M2M common service. By using such an M2M common service, an M2M application may be easily implemented without configuring a basis service framework in each M2M application.

An M2M service may be provided in a group form of a service capability (SC) 20, and the M2M application 10 may use an M2M service or function provided by the SC by approaching a SC group or SC through an open interface. An M2M service capability 20 may provide a function constituting an M2M service (for example, device management, location, discovery, group management, registration, security, etc.), and an SC layer or SC entity may be a group of functions for an M2M service which are used when an M2M application is provided on a service framework.

An SC may be represented as xSC. Herein, x may be represented by any one of N/G/D, and represents whether an SC is present in a network (or server or both), in a gateway, or in a device. For example, an NSC represents an SC present on a network or server or both, and GSC represents an SC present on a gateway.

An M2M application may be present on a network, a gateway, or a device. An M2M application present on a network or present by being directly connected to a server may be referral as an M2M network application, briefly, a network application (NA). For example, an NA may be software implemented by being directly connected to a server, perform communication with an M2M gateway or M2M device, and perform functions of managing the M2M gateway or M2M device. An M2M application present on a device may be referred as an M2M device application, briefly, a device application (DA). For example, a DA may be software executed in an M2M device, and transfer sensor information, etc. to an NA. An M2M application present on a gateway may be referral as an M2M gateway application, briefly, a gateway application (GA). For example, a GA may perform a function of managing an M2M gateway, or provide to a DA an M2M service or function (for example, SCs or SC). An M2M application may refer to an application entity (AE) and an application layer.

Referring to FIG. 1, an M2M system architecture may be divided into a network domain 10, a device, and a gateway domain 20. A network domain may include functions 11 for managing an M2M system and functions 12 for managing a network. A function for managing an M2M system may be performed by an M2M application and M2M SCs managing devices present on a domain of a device and a gateway, and a function for managing a network may be performed by a core network and an access network. Accordingly, in an example of FIG. 1, a core network 13 and an access network 14 may provide a function of connecting respective entities rather than performing an M2M function. By using a core network 13 and an access network 14, M2M communication between M2M SCs may be performed in a network domain 10, a device, and a gateway domain 20, and an M2M application of each domain may transmit and receive a signal or information through M2M SCs of each domain.

An access network 14 is an entity enabling an M2M device and a gateway domain to perform communication with a core network 13. As an example of an access network 14, xDSL (Digital Subscriber Line), HFC (Hybrid Fiber Coax), satellite, GERAN, UTRAN, eUTRAN, wireless LAN, WiMAX, etc. are used.

A core network 13 may be an entity providing a function of IP (Internet protocol) connection, service and network control, interconnection, roaming, etc. A core network 13 may include 3GPP (3rd generation partnership project) core network, ETSI TISPAN (telecommunications and internet converged services and protocols for advanced networking) core network, 3GPP2 core network, etc.

An M2M SC 15 may provide an M2M common service function (CSF) that is possibly shared among various M2M network applications, and enable M2M applications 16 to use an M2M service by exposing M2M services through an open interface. An M2M SCL may refer to a layer including such M2M SC entities or M2M common service functions.

An M2M application 16 is an entity operating a service logic, and possibly using M2M SCs through an open interface. An M2M application layer may refer to a layer including such an M2M application and related-operational logic.

An M2M device 21 is an entity operating an M2M device application through M2M SCs. An M2M device 21 may directly perform communication with an M2M server of a network domain, and perform communication with an M2M server of a network domain through an M2M gateway 22. When connection is performed through an M2M gateway 22, an M2M gateway 22 functions as a proxy. An M2M device 21 may include an M2M application or M2M SCs or both.

An M2M area network 23 provides connectivity between an M2M device and an M2M gateway. Herein, a network between an M2M gateway and an M2M server, and a network between an M2M device and an M2M gateway may be different. In an embodiment, an M2M area network may be implemented by using a PAN (personal area network) technique such as IEEE802.15.1, Zigbee, Bluetooth, IETF ROLL, ISA100.11a, etc. and a local network technique such as PLC (power line communication), M-BUS, wireless M-BUS, KNX, etc.

An M2M gateway 22 may manage an M2M application through M2M SCs, and may be an entity providing a service of an M2M application. An M2M gateway 22 may perform a function of a proxy between an M2M device 21 and a network domain 10, and a function of providing a service to a non-compliant M2M device. An M2M gateway 22 may refer to an entity having a gateway function among M2M devices 21. An M2M gateway 22 may include an M2M application or M2M SCs or both.

An M2M system architecture shown in FIG. 1 is an example, and each entity may be referred differently. For example, an M2M SC may be referral as an M2M common service function, and a SCL may be referral as a common service layer or common service entity. In addition, an M2M application may be referred as an application entity, and an M2M application layer may be briefly referral as an application layer. Similarly, each domain may be also referred differently. In one embodiment, a network domain in one M2M system may be referral as an infrastructure domain, and a device and a gateway domain may be referred as a field domain.

As shown in an example of FIG. 1, an M2M system may be understood as a layered structure including an M2M application layer and an M2M SC layer for M2M communication.

Figure 2:
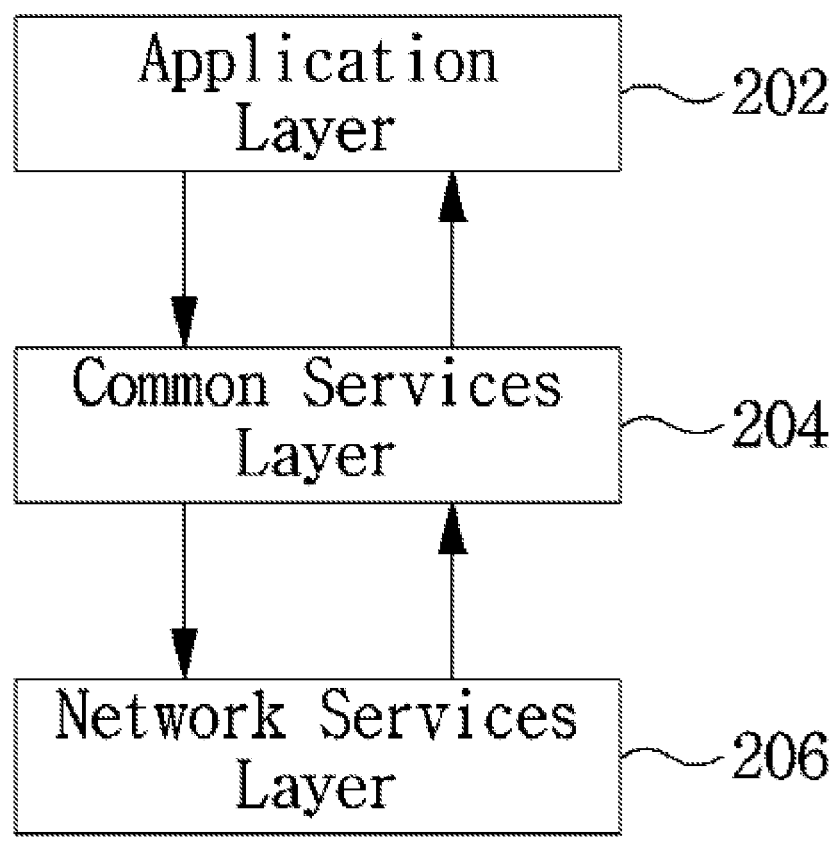
FIG. 2 is a view showing a layered structure of an M2M system according to an embodiment.

FIG. 2 is a view showing a layered structure of an M2M system according to an embodiment.

Referring to FIG. 2, an M2M system may include an application layer 202, a common service layer 204, and an underlying network service layer 206. As described above, the application layer 202 may correspond to an M2M application layer, and the common service layer 204 may corresponds to an M2M SCL. The underlying network service layer 206 provides to the common service layer 204 services such as device management present on a core network, location service, device triggering, etc.

Figure 3:
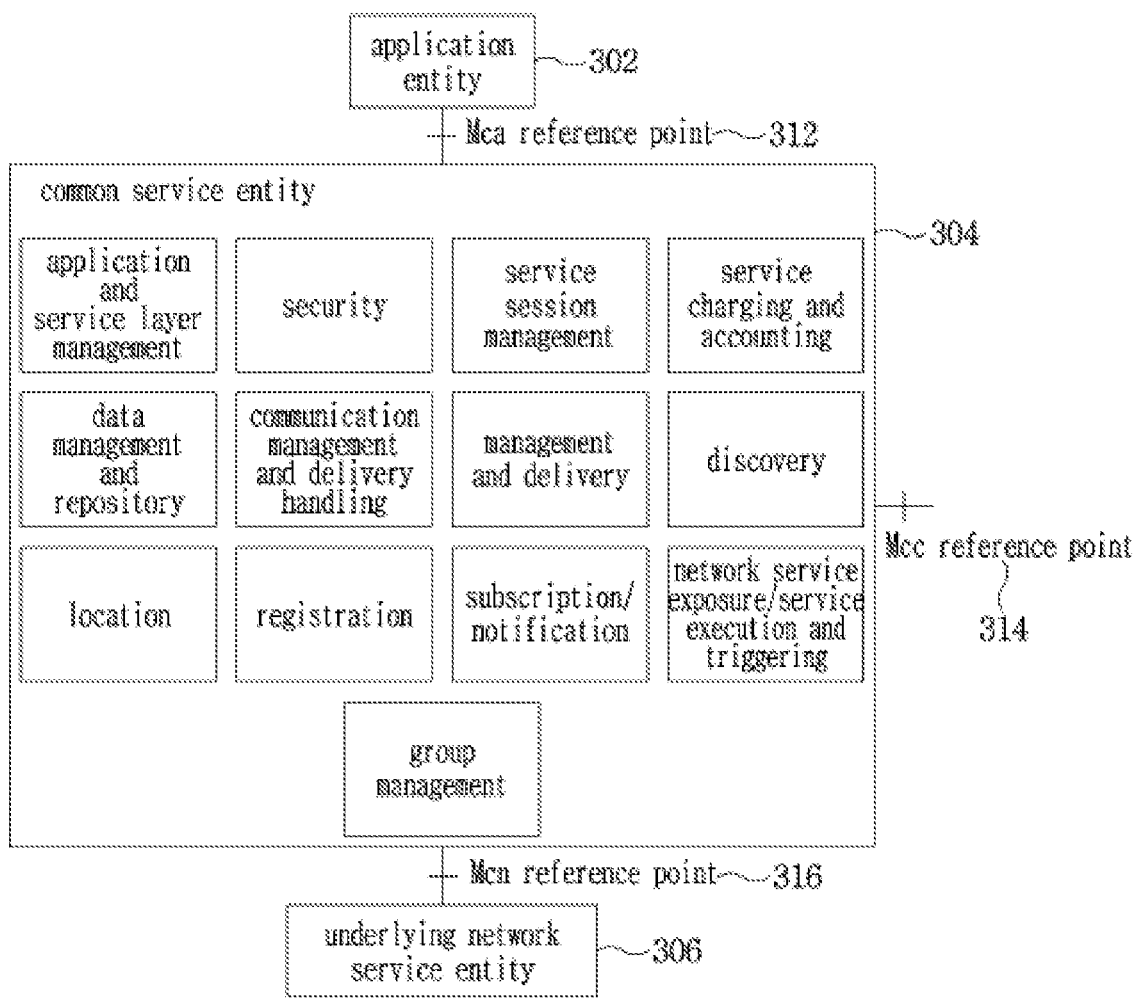
FIG. 3 is a view showing a communication flow between each entity according to an embodiment.

Referring to FIG. 3, an Mca reference point 312 may specify a communication flow of an application entity 302 and a common service entity 304. An Mca reference point 312 may enable the AE 302 to use a service provided from the CSE 304, and enable the CSE 304 to perform communication with the AE 302. An Mca reference point 312 may refer to an interface between an M2M application layer and an M2M common service layer (or entity).

An Mcc reference point 314 may specify a communication flow between other common service entities 304. An Mcc reference point 314 may enable the CSE 304 to use a service of another CSE when providing necessary functions. A service provided through an Mcc reference point 314 may be dependent on functions supported by the CSE 304. An Mcc reference point 314 may refer to an interface between M2M common service layers.

An Mcn reference point 316 may specify a communication flow between the CSE 304 and an underlying network service entity (NSE) 306. An Mcn reference point 316 may enable the CSE 304 to use a service provided from the underlying NSE 306 for providing required functions. An Mcn reference point 316 may refer to an interface between an M2M common service layer, and an M2M underlying network layer.

In addition, in an example of FIG. 3, the CSE 304 may provide various common service functions/capabilities. For example, the CSE 304 may include at least one function of application and service layer management, communication management and delivery handling, data management and repository, device management, group management, discovery, location, network service exposure/service execution and triggering, registration, security, service charging and accounting, service session management, and subscription/notification. The CSE 304 indicates an instance of the common service functions, and provides a sub-set of common service functions possibly used by and shared among M2M applications. Common service functions will be schematically described in below.

Application service layer management (ASM): providing management functions of AEs and CSEs. For example, an ASM function may configure a function of CSEs, may be a troubleshoot and upgrade the same, and upgrade a function of AEs.

Communication management and delivery handling (CMDH): providing communication with other CSEs, AEs, and NSEs. For example, a CMDH function may determine when and how to use connection for CSE-CSE communication (CSE-to-CSE communication), and control such that specific requirements are delivered to be delayed.

Data management and repository (DMR): enabling data exchanging and sharing among M2M applications. For example, a DMR function may collect/aggregate a large amount of data, and convert data into a specific format, and store the same.

Device management (DMG): in addition to an M2M gateway and an M2M device, managing a device function for devices present on an M2M area network. For example, a DMG function may perform application installation and configuration, firmware update, logging, monitoring, diagnostics, network topology management, etc.

Discovery (DIS): searching information such as information and resource according to a request within a designated range and condition.

Group management (GMG): for example, a group may be created by combining resource, an M2M device, or an M2M gateway, and a GMG function may perform handling a request related to the group.

Location (LOC): obtaining positional information of an M2M device or M2M gateway by an M2M application.

Network service exposure/service execution and triggering (NSSE): enabling communication of a underground network, and enabling to use a service or function provided from the underground network.

Registration (REG): performing a function of registering M2M application or another CSE to a specific CSE. Registration may be performed to use an M2M service function of a specific CSE.

Security (SEC): performing a function of handling sensitive data such as a security key, security association establishment, authentication, authorization, ID (Identity) protection, etc.

Service charging and accounting (SCA): performing a function of providing charging and accounting to an AE or CSE.

Service session management (SSM): performing a function of managing an M2M session of a service layer for end-to-end communication.

Subscription/notification (SUB): performing a notification function when a subscription for change in a specific resource is performed and the corresponding resource has been changed.

Figure 4:
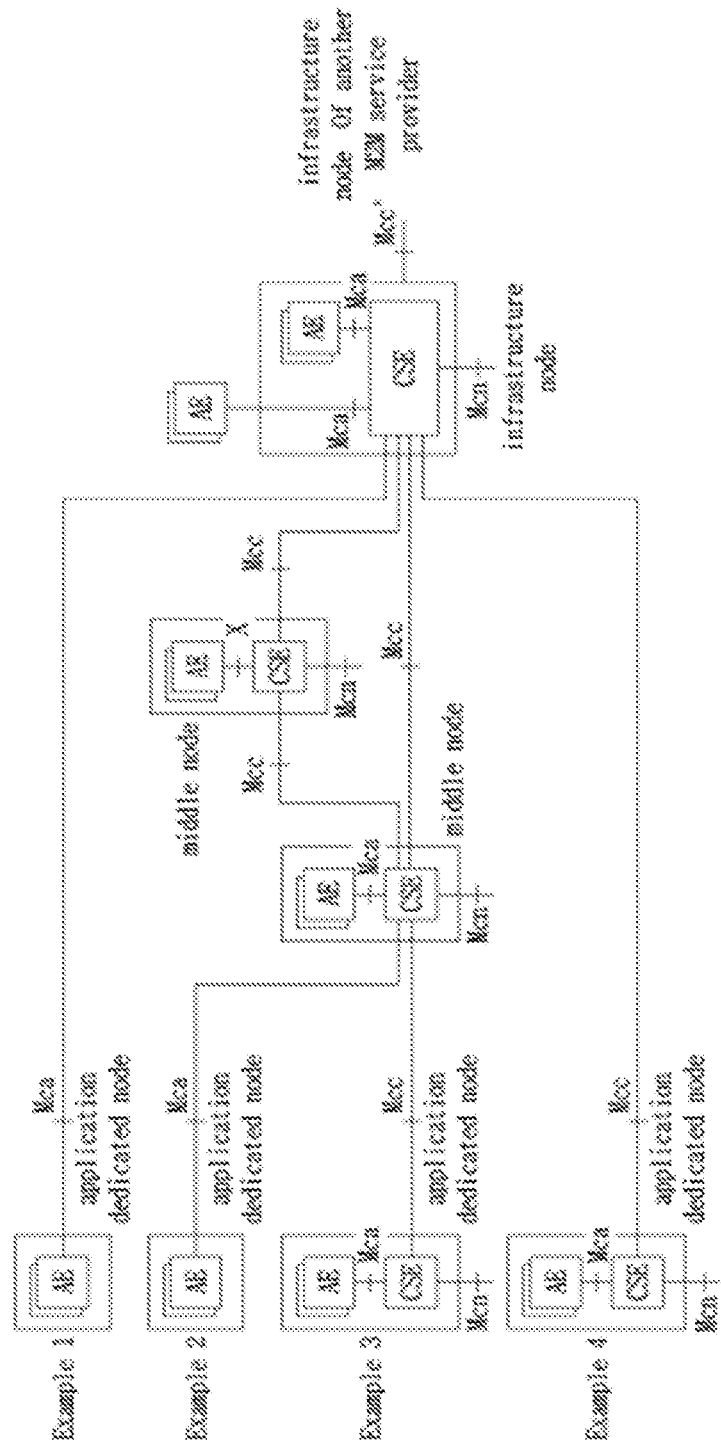
FIG. 4 is a view showing a configuration of an M2M system according to an embodiment.

FIG. 4 is a view showing a configuration of an M2M system according to an embodiment. In the present specification, a node means an entity including at least one M2M application or an entity including one CSE and at least zero M2M application.

An application dedicated node (ADN) may refer to a node including at least one application entity but not including a common service entity. An ADN may perform communication with one middle node (MN) or one infrastructure Node (IN) through an Mca. An ADN may be referred as an M2M device having a constrained capability, and the M2M device having a constrained capability may refer to a common service layer or M2M device not including a common service entity. An M2M device having a constrained capability may be briefly referred as a constrained M2M device.

An application service node (ASN) may refer to a node including at least M2M application entity and at least one common service entity. An ASN may perform communication with one middle node or one infrastructure Node through an Mca. An ASN may be referred as an M2M device.

A middle Node may refer to a node having one common service entity and at least zero M2M application entity. An MN may perform communication with one IN or another MN through an Mcc, perform communication with an IN/MN/ASN through an Mcc, or perform communication with an ADS through an Mca. An MN may be referred as an M2M gateway.

An infrastructure node may refer to a node including one common service entity and at least zero application entity. An IN may perform communication with at least one MN or with at least one ASN or both through an Mcc. Alternatively, an IN may perform communication with at least one ADN through an Mca. An IN may be referral as an M2M server.

Referring to FIG. 4, a first example shows communication between an ADN and an IN. An ADN may be a M2M device having a constrained capability. Herein, an ADN does not include a CSE or common service layer, and thus performs communication with a CSE of an IN through an Mca. In addition, herein, an ADN does not include a CSE or common service layer, and thus may not store/share with another entity data created in an AE or application layer. Accordingly, in the "first example", data created in an AE of an ADN or application layer may be stored and shared in a CSE of an IN.

In an example, a "second example" shows communication between an ADN and an MN. An ADN may be also an M2M device having a constrained capability. Accordingly, an ADN may operate similar to the first example except that the ADM performs communication with a CSE of an MN. In other words, an ADN may perform communication with a CSE of an MN through an Mca. In addition, an ADN does not include a CSE or common service layer, and thus may not store/share with another entity data created in an AE or application layer. Accordingly, data created in an AE of an ADN or application layer may be stored and shared in a CSE of an MS.

Meanwhile, in the "second example", an MN may perform communication with an IN via an MN. Herein, an MN and an MN, and an MN and an IN may perform communication through an Mcc. An MN may directly perform communication with an IN without passing an MN.

A "third example" shows a communication example between an ASN and an MN. Different to the "first example" or "second example", an ASN includes a CSE or common service layer, and thus may store data created in an AE of an ASN or application layer in his CSE or common service layer. In addition, an AE of an ASN may perform communication with an CSE of an MN through a CSE of an ASN.

A "fourth example" shows a communication example between an ASN and an MN. Comparing with the "third example", a CSE of an ASN may directly perform communication with a CSE of an IN without passing an MN.

An IN may be positioned in an infrastructure domain or network domain, and include one CSE and at least zero AE. INs may perform communication with each other through an Mcc.

Figure 5:
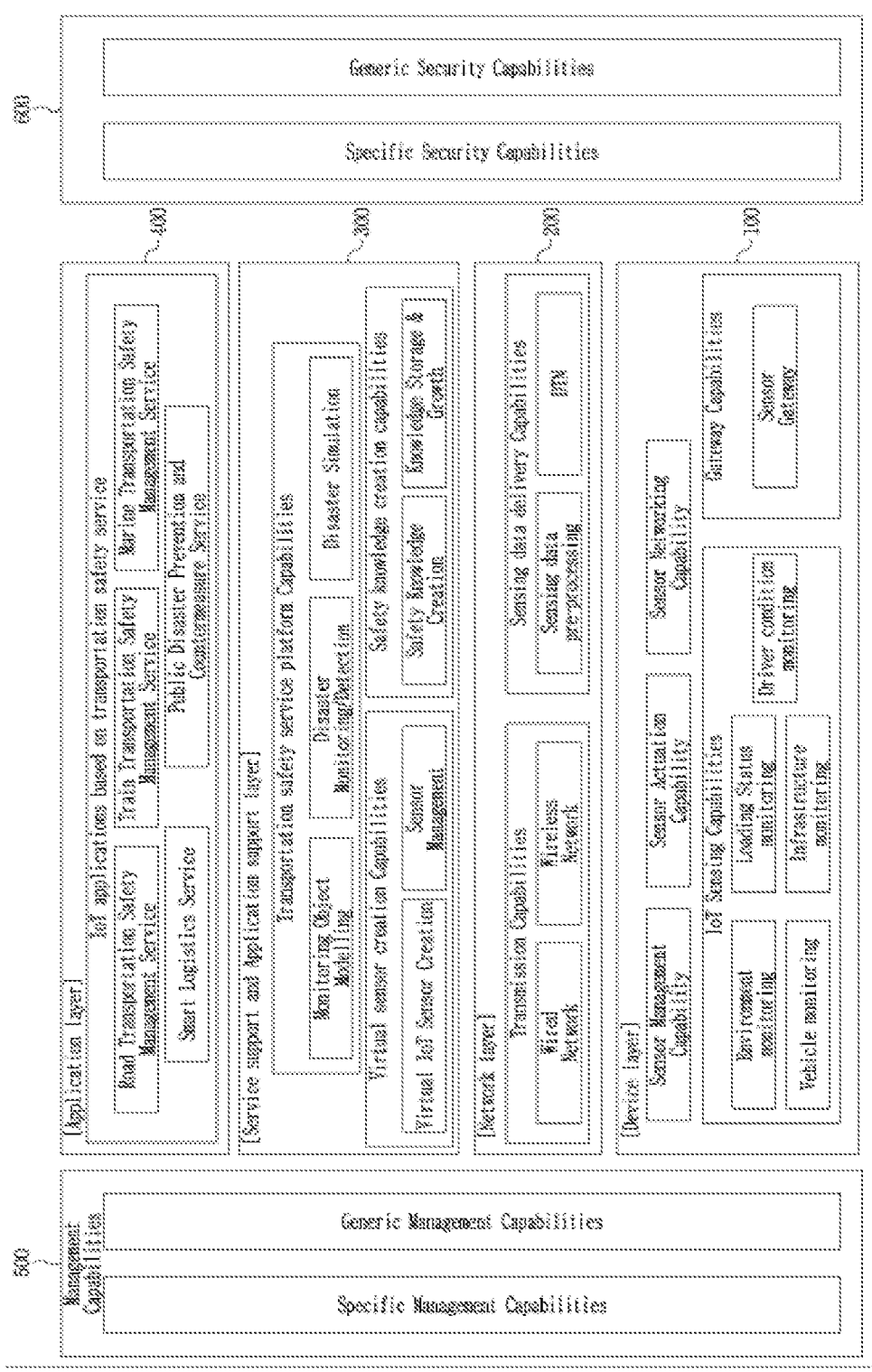
FIG. 5 is a view of an architecture for transportation safety services according to an embodiment of the present invention.

FIG. 5 is a view of an architecture for transportation safety services according to an embodiment of the present invention. FIG. 5 shows an example architecture of a case where an M2M system according to FIGS. 1 to 4, and a functional architecture are applied to transportation safety services. For example, an architecture for transportation safety services includes four horizontal layers, that is, a device layer 100, a network layer 200, a service support and application support layer 300, and an application layer 400, and two vertical entities, that is, a management entity 500, and a security entity 600. As described with reference to FIG. 1, each may include an M2M service capability, and FIG. 5 may be defined as a capability for providing transportation safety services.

A device layer 100 may obtain sensing data and support various capabilities for delivering/transmitting to the network layer 200. Herein, each of capabilities will be described as below.

① Sensor management capability: a sensor management capability may generate a control message for establishing a sensor, detecting a state of a sensor operation, and managing a sensor. In an example, state information of a sensor may be reported to a service support and application support layer through a sensor gateway. When some IoT sensor malfunctions (for example, a case of a sensor failure where a sensing value of a sensor exceeds a predetermined threshold value), an operation may be performed by enabling the function of a malfunctioning sensor to be taken over by another sensor. In addition, when IoT sensing data is abnormal, a sensor management capability may control the abnormal IoT sensor by cooperating with a sensor actuation capability. In addition, a sensor management capability may manage a power state of a sensor so as to expand an operating life, and control a transmission period of measured data.

② Sensor actuation capability: a sensor actuation capability generates a sensor control message for operating a sensor for a purpose of a user or thing or both. For example, IoT sensor calibration for refreshing or creating a virtual IoT sensor for operation of an IoT sensor may correspond thereto.

③ Sensor networking capability: a sensor networking capability supports a WSN (wireless sensor networking) configuration for vehicles and infrastructures. In case of vehicles, WSN may be inner and outer environments of a vehicle. Particularly, in case of wireless sensing networking, minimizing signal interference is required. In order to expand coverage of a WSN service, a relay supporting a multi-hop relay and mesh networking may be used.

④ Sensor gateway capability: a sensor gateway capability supports an interconnection function between WSN and WCN (wideband communication networking) such as a backbone network or mobile communication network. All of sensing data may be delivered to a network layer through a sensor gateway. A sensor gateway may perform a function of converting protocol between WSN and WCN. In addition, a sensor gateway may provide a GUI (graphic user interface) on the basis of a monitoring function for displaying safety information on a screen of a (bus?) terminal.

⑤ IoT sensing capability: an IoT sensing capability may include vehicle monitoring, infrastructure monitoring, environment monitoring, loading status monitoring, driver condition monitoring, etc.

In addition, capabilities of the network layer 200 will be described as below.

① Transmission capability: a transmission capability may include a wireline network interconnection capability supporting an interconnection function that delivers sensing data to an Internet entity by using a wireline network such as an optical or Ethernet network, and a wireless network interconnection capability supporting a function that delivers sensing data to an Internet entity by using a mobile network and a local wireless network such as 2G, 3G, 4G, and 5G.

② Sensing data delivery capability: a sensing data delivery capability may include a sensing data pre-processing capability and a DTN (delay/disruption tolerant network) capability. Herein, a DTN capability supports interconnection between WSN and Internet networking when a permanent backbone network is not present. Unnamed air vehicles, smartphones, vehicles may provide an intermittent backbone for delivering sensing data stored in a DTN gateway.

In addition, capabilities of the service support and application support layer 300 will be described as below.

① Virtual sensor creation capability: a virtual sensor creation capability may include a capability of creating an IoT sensor and managing a sensor. A virtual sensor creation capability supports a function of creating a new IoT sensor by combining various IoT sensor for monitoring a specific object. Such a function may save cost by avoiding temporary or permanent configuration of new physical IoT sensors. A sensor management capability may support a function of monitoring a state of an IoT sensor such as normal/abnormal state and a power level of a sensor. In addition, an IoT sensor may be remotely controlled by the above function. The above function may cooperate with a sensor management capability of a device layer.

② Transportation safety service platform capability: a transportation safety service platform capability may include a monitoring object modeling capability, disaster monitoring platform, and a disaster monitoring and detection capability. A monitoring object modeling capability may support a function of classifying vehicles and infrastructures by various normal models so as to configure an IoT sensor and for simulation reference. When a new IoT sensor is configured, an IoT sensor configuration point and a number of IoT sensors may be determined by the above function. In addition, accident simulation and disaster prediction may be possible by using the above normal object models. Disaster monitoring platform may possibly estimate a size/severity of the disaster by using IoT sensing data so as to prevent accident. In order to predict disaster, the above platform generates a disaster prediction model by using ioT sensing data. A disaster monitoring and detection capability may support a function of monitoring a disaster display in real-time. When measured data reaches a threshold value, such information may be delivered to disaster simulation platform.

③ Safety knowledge creation capability: a safety knowledge creation capability may perform a safety knowledge creation capability and a knowledge storage and index updating capability. A safety knowledge creation capability may estimate a safety degree of transportation vehicle/infrastructure by analyzing IoT sensing data. In case of vehicle, maintenance history may be also used. A knowledge storage and index updating capability may create a safety index in a knowledge format with context information, and update knowledge information. Safety knowledge of an object may vary under the same condition.

Figure 6A:
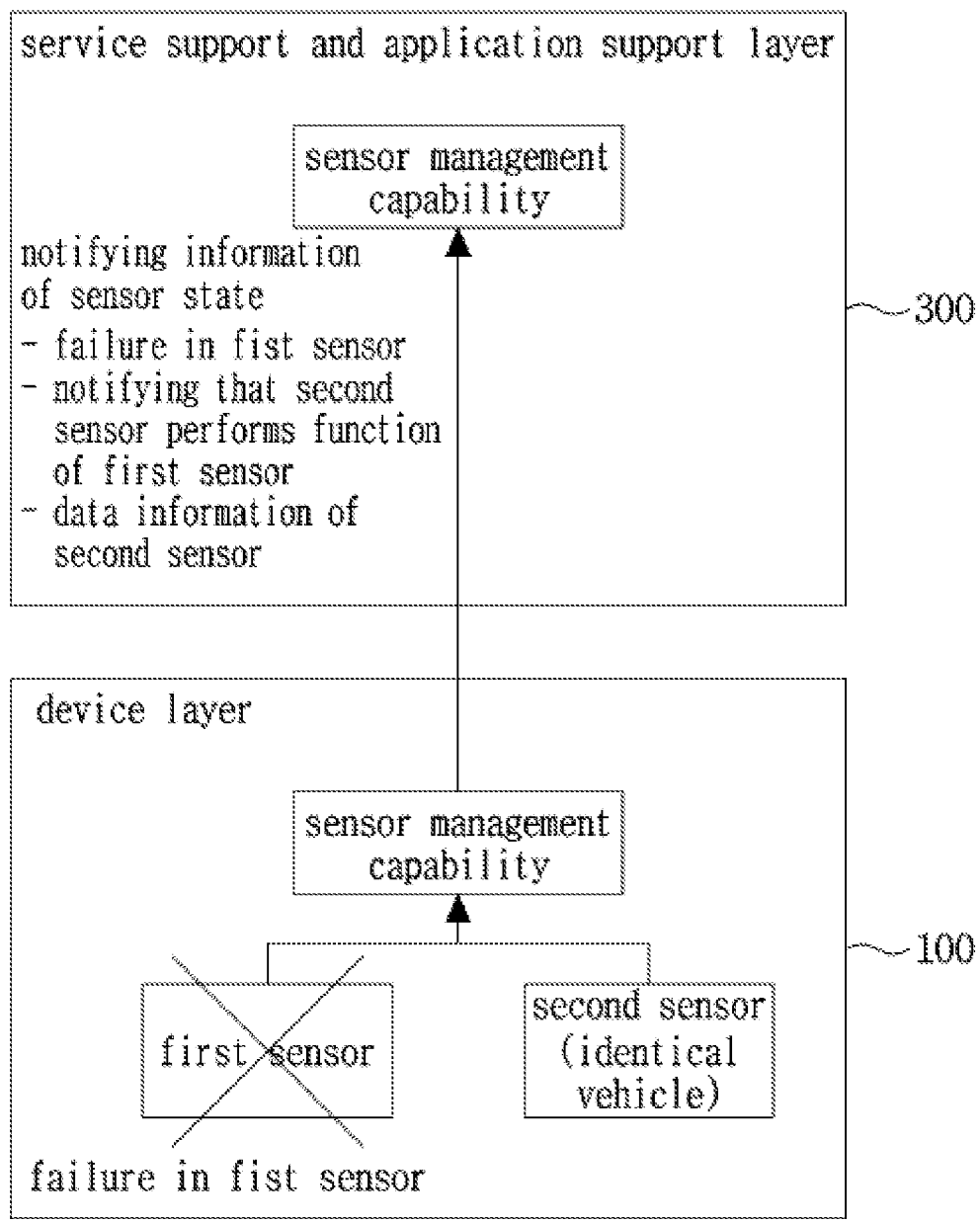
FIGS. 6A-6C are views showing a countermeasure for a case of a sensor failure according to an embodiment of the present invention.
Figure 6B:
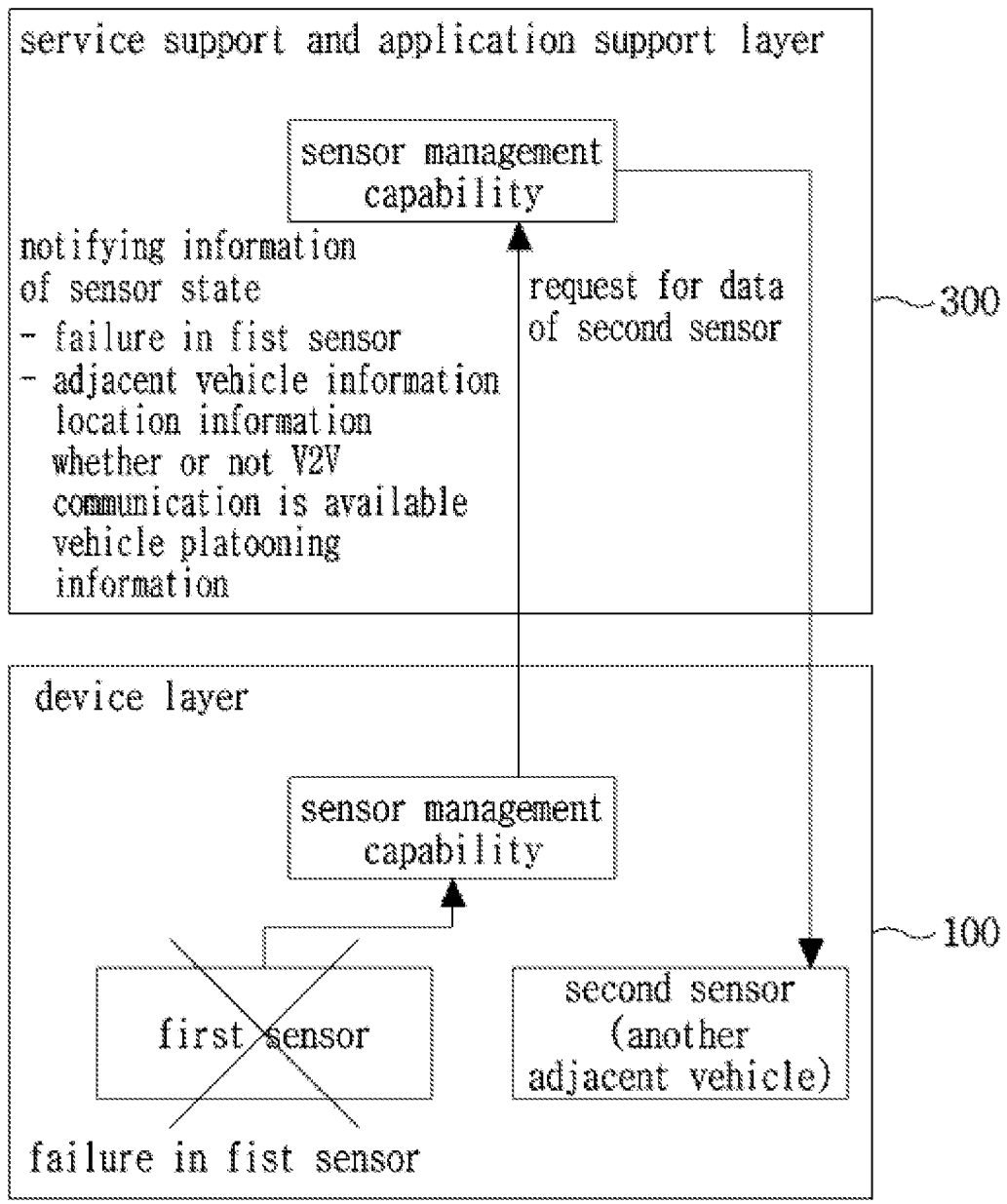
Figure 6C:
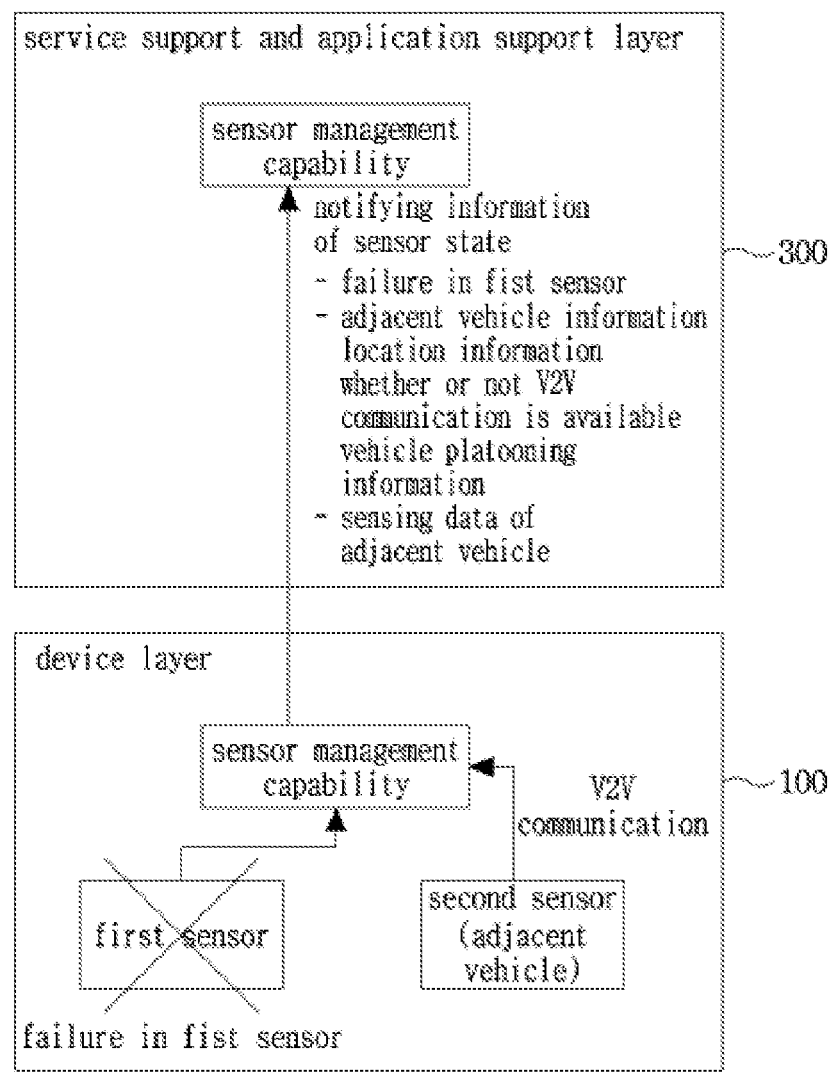

FIGS. 6A-6C are views showing a countermeasure for a sensor failure case according to an embodiment of the present invention.

In detail, FIGS. 6A to 6C are views of countermeasures for a sensor failure according to an embodiment of the present invention. In an example, as described above, a device layer may obtain sensing data, and support various capabilities for delivering/transmitting the obtained data to a network layer.

Herein, based on the above operation, when a sensor failure occurs, rapid notification of failure information may be performed, and a countermeasure is essential to a sensor failure for continuous service/application use. In an example, for a sensor related to vehicle safety, taking into account safety, a sensor failure may be responded to by using data another sensor when the another sensor possibly performs the function of the failed sensor.

In detail, base on the above sensor management capability, a sensor may be configured or established. Herein, in an example, based on a sensor management capability, a state of sensor operation may be detected, and a control message for controlling the sensor may be created. In an example, a control message may include status information of a sensor. Herein, the above device layer 100 may report state information of a sensor to a service support and application support layer 300. Herein, reporting state information of a sensor may be performed through a sensor gateway.

Based on the above, when a specific sensor malfunctions, another sensor included in the same device or adjacent device may be recommended for collecting sensing data in place of the sensor that malfunctions. Herein, in an example, a specific sensor may be a sensor managed on the basis of a sensor management capability as described above. In addition, in an example, a case where a specific sensor malfunctions may be a case where a sensor failure has occurred so that operation itself is not performed. In another example, a case where a specific sensor malfunctions may be a case where a predetermined condition for data sensed by a specific sensor is equal to or smaller than a threshold value. In an example, when data sensed by a specific sensor is a signal, and signal strength is equal to or smaller than a threshold value, it may be determined that the sensor malfunctions. In other words, various conditions may be set for a case where a sensor does not operate, but it is not limited to the above-described embodiment.

In addition, in an example, the above sensors may be IoT sensors. In other words, as described above, it may be a sensor included in an M2M device or device operating based on IoT.

In addition, in an example, the above specific sensor or a device including a sensor that possibly performs the function of a malfunctioning sensor and possibly collects sensing data when the specific sensor malfunctions may be a vehicle. In other words, when a specific sensor malfunctions, a sensor possibly performs the function of the malfunctioning sensor and possibly collects data in place of the same may be included in the same vehicle or another vehicle, and the detail of the same will be described with reference to FIGS. 6A to 6C in below. Herein, in an example, a vehicle is not limited in a car, may be a movable object, but it is not limited to the above-described embodiment.

In addition, in an example, a vehicle and another adjacent vehicle where a specific sensor is included may support V2V communication (vehicle to vehicle communication). In an example, a vehicle and another adjacent vehicle may operate on the basis of vehicle platooning. In other words, another sensor may be recommended when communication is available with a vehicle including a sensor possibly performing a function of a malfunctioning sensor.

Meanwhile, in an example, in order to obtain sensing data from a sensor possibly performing a function of a malfunctioning sensor in place of a specific sensor, state data of the same may be reported. Herein, state information of the same may be reported to a user. Herein, when a vehicle is a user, state information may be reported to a driver. Herein, in an example, as described above, when a possibly performing a function of a malfunctioning sensor is present in another adjacent device (or "vehicle"), reported state information may include information of the another adjacent device. In other words, information of a device including a sensor possibly performing a function of a malfunctioning sensor may be reported. Subsequently, whether or not a sensor possibly performing a function of a malfunctioning sensor performs the function of the specific sensor that malfunctions may be determined on the basis of reported information. Herein, when it is determined that sensor possibly performing the function of the malfunctioning sensor performs the function of the specific sensor, the device layer 100 described above may report the same to the service support and application support layer 300. Subsequently, a sensor possibly performing the function of the malfunctioning sensor may sense data, and transmit the same.

In another example, when a specific sensor malfunctions or is in an abnormal state, the sensor may be controlled according to an operation capability of the sensor on the basis of sensor management capability. In other words, a specific sensor may be controlled to correctly operate on the basis of a sensor management capability. In addition, in an example, a power state may be managed on the basis of a sensor management capability so as to expand an operation time of a sensor. In addition, in an example, a power state may be managed on the basis of a sensor management capability so as to control a transmission period of measured data, but it is not limited to the above-described embodiment.

As a specific example, the above specific sensor may be a first sensor, and a sensor possibly performing a function of the first sensor may be a second sensor. Herein, a second sensor may be included in a first vehicle with a first sensor. In addition, in an example, a second sensor may be included in a second vehicle adjacent to a first vehicle, but it is not limited to the above-described embodiment. Meanwhile, a second vehicle adjacent to a first vehicle may support V2V communication, and perform communication on the basis of the same. In an example, a first vehicle and a second vehicle may be vehicles possibly performing communication on the basis of vehicle platooning. Herein, in an example, a first vehicle and a second vehicle may be connected on the basis of vehicle platooning. In addition, in an example, a first vehicle and a second vehicle may perform communication even though they are not connected.

Meanwhile, when a first sensor malfunctions, a second sensor may be recommended so as to collect sensing data. Herein, in an example, state information of the second sensor may be reported. In addition, in an example, when the second sensor is included in a second vehicle, state information of the second sensor and the second vehicle may be reported. Subsequently, whether or not to the second sensor performs the function of the first sensor may be determined on the basis of reported state information. Herein, when the second sensor is determined to perform the function of the first sensor, a device layer may deliver information of the same to a service support and application support layer. Subsequently, the second sensor may transmit sensing data, but it is not limited to the above-described embodiment.

Subsequently, as a more specific embodiment, referring to FIG. 6A, in case of a first sensor failure, a sensor management capability of a device layer 100 may notify a service support and application support layer 300 of failure information of the first sensor. Herein, when a second sensor possible performing a function of the first sensor is present in the same vehicle, a sensor management capability of the device layer 100 may notify the service support and application support layer 300 of information and data information of the sensor possible performing a function of a malfunctioning sensor when notifying the failure information of the first sensor. Herein, in an example, the first sensor and the second sensor may not be the same-type sensor. However, in an example, the first sensor and the second sensor may be sensors collecting similar information or collecting related information. In other words, the second sensor may be a sensor possibly performing the function of the first sensor.

Meanwhile, a first sensor and a second sensor possibly performing a function of a malfunctioning sensor may be preset. In an example, when notifying an abnormal driving state of a vehicle, the first sensor may be a sensor providing forward image information of the vehicle, and the second sensor may be a sensor of a steering wheel of the vehicle. Herein, an abnormal driving state may be determined from forward image information provided from the first sensor. Herein, when it is determined to be an abnormal driving state, information of the second sensor and data information of the second sensor may be reported since it may be a case where a steering wheel of the vehicle operates abnormally.

Meanwhile, in another example, a first sensor may be a sensor detecting backward image on the basis of a side view mirror, and a second sensor may be a sensor detecting backward image on the basis of a rear view mirror. Herein, when the first sensor malfunctions, the device layer 100 may deliver to the service support and application support layer 300 information of the second sensor detecting similar images and data information of the second sensor. In more detail, the device layer 100 may deliver to the service support and application support layer 300 at least one of failure information of the first sensor, replacement notification information of the second sensor, and data information of the second sensor, but it is not limited to the above-described embodiment. Herein, when the function of a malfunctioning sensor can be taken over by another sensor, data sensed by the second sensor may be used.

In addition, referring to FIG. 6B, in case of a first sensor failure, a sensor management capability of a device layer 100 may notify a service support and application support layer 300 of failure information of the first sensor. Meanwhile, in case of a first sensor failure, a sensor management capability of the device layer 100 may notify failure information of the first sensor with information of an adjacent vehicle. In other words, location information of a corresponding vehicle equipped with the first sensor, and location information of a vehicle adjacent to the corresponding vehicle, etc. may be notified. In an example, a corresponding vehicle may identify location information of an adjacent vehicle by using V2V communication history. Meanwhile, when a corresponding vehicle and an adjacent vehicle are under a vehicle platooning state, such vehicle platooning information may be also notified, but it is not limited to the above-described embodiment.

When a data value of an adjacent vehicle is possibly used as a data value of vehicle first sensor which is to be delivered, adjacent vehicle information of FIG. 6B may be transmitted to the service support and application support layer 300, and thus the service support and application support layer 300 may obtain data, that is in place of the data of the first senor, information from the second sensor of the adjacent vehicle.

Meanwhile, whether or not a function of a malfunctioning sensor can be taken over by another sensor of an adjacent vehicle may be determined in advance according to a data type. For example, when a failure occurs in a left vision sensor of a corresponding vehicle, data from a right vision sensor of an adjacent vehicle driving at the right of the corresponding vehicle may be received in place of the left vision sensor. In other words, the device layer 100 may deliver to the service support and application support layer 300 at least one of failure information of a first sensor and adjacent vehicle information when the first sensor malfunctions. Subsequently, information sensed from the second sensor may be received.

In addition, in an example, referring to FIG. 6C, in case of a first sensor failure, a sensor management capability of a device layer 100 may notify a service support and application support layer 300 of failure information of the first sensor. Meanwhile, in case of a first sensor failure, a sensor management capability of the device layer 100 may obtain information of a second sensor that possibly perform a function of the first sensor through V2V communication with an adjacent vehicle. Accordingly, failure information of the first sensor and adjacent vehicle information (location information, V2V communication information, vehicle platooning information), and sensing data of the second sensor of the adjacent vehicle may be notified together. Herein, determining whether or not a sensor possibly performs a function of a malfunctioning sensor or using sensing data of another vehicle is available may be performed in a corresponding vehicle or adjacent vehicle or both.

In a specific example, the device layer 100 may deliver to the service support and application support layer 300 state information of the first sensor. Herein, state information of the first sensor may be delivered through a sensor gateway. In an example, when the first sensor malfunctions, the device layer 100 may recommend an adjacent vehicle for obtaining sensing data through the adjacent vehicle. Herein, the device layer 100 may transmit to the service support and application support layer 300 state information of the adjacent vehicle and a second sensor included in the adjacent vehicle. Subsequently, whether or not to sense data by using the second sensor of the adjacent vehicle may be determined. Herein, when it is determined to sense data through the second sensor of the adjacent vehicle, the device layer 100 may deliver to the service support and application support layer 300 information of the same, and receive data sensed by the second sensor.

Subsequently, FIGS. 7A-7D are views showing a detailed method of using a sensor of an adjacent vehicle based on FIGS. 6A-6C.

Figure 7A:
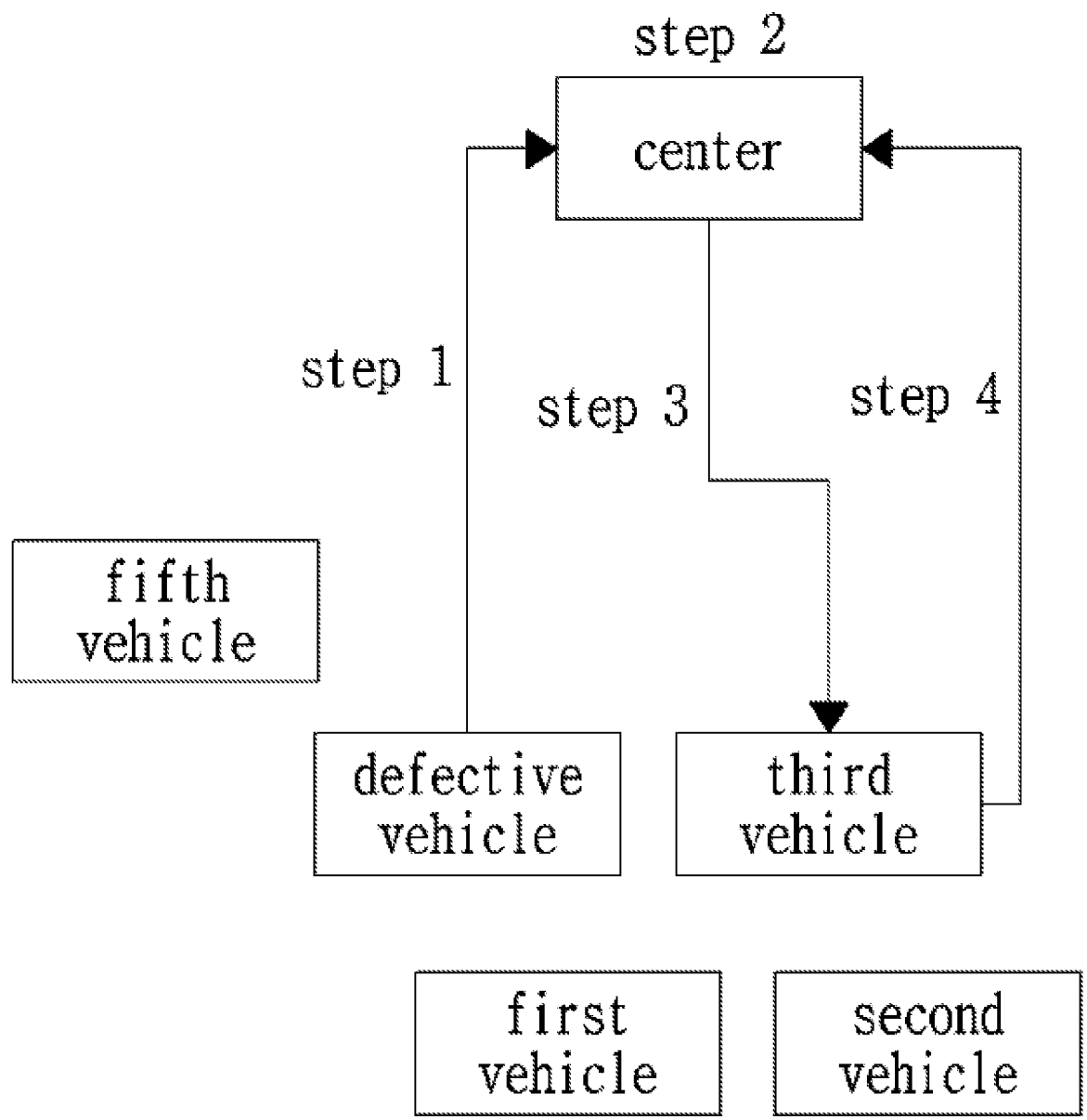
FIGS. 7A-7D are views showing a countermeasure for a case of a sensor failure according to another embodiment of the present invention.

Based on FIG. 7A, first, a defective vehicle may detect that a forward sensor malfunctions, and report to the center that the forward sensor malfunctions (step 1). Herein, the center may determine that a third vehicle is located right in front of the defective vehicle, and that a backward sensor of the third vehicle that is located front of the defective vehicle possibly performs the function of the forward sensor of the defective vehicle on the basis of GPS information periodically received from each vehicle (step 2). The center may transmit a request for backward sensor information of the third vehicle, and the third vehicle may transmit a reply after evaluating an available bandwidth and data rate (step 3). Subsequently, the function of the forward sensor of the defective vehicle may be performed by the backward sensor of the third vehicle through agreement between the center and the third vehicle (step 4).

Figure 7B:
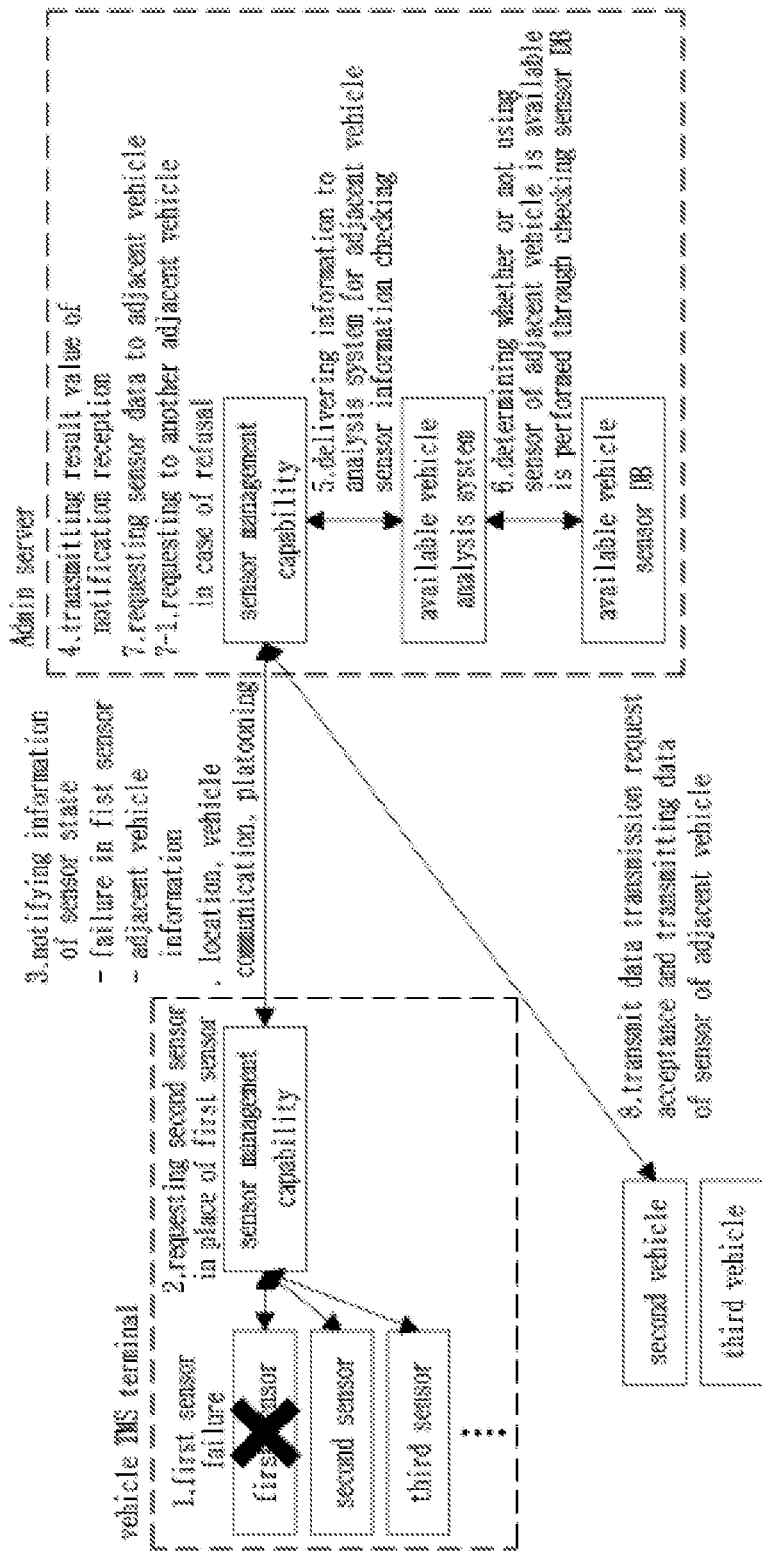

Herein, FIG. 7B is a view showing the detail method than FIG. 7A. In an example, referring to FIG. 7B, a vehicle may include a plurality of sensors. In addition, a device layer of the vehicle may have a sensor management capability. In other words, the plurality of sensor within the vehicle may be managed on the basis of the sensor management capability, and this is as described above.

Herein, as described above, a first sensor failure may occur. Herein, the failure may be a case where the first sensor malfunctions or a case where a measured value of the first sensor is equal to or smaller than a threshold value. Herein, the vehicle may transmit information of a sensor state to a management server (administration server). In other words, the vehicle may transmit to the server failure information of the first sensor. Herein, a device layer of the management server may also have a sensor management capability. Herein, the device layer of the management server may deliver to an analysis system information so as to determine adjacent vehicle sensor information of the above vehicle on the basis of the sensor management capability. In other words, the management server may determine whether or not an adjacent vehicle sensor replacing sensor database with an adjacent vehicle sensor is available on the basis of an available vehicle analysis system. Herein, the management server may exchange as vehicle information adjacent to the above vehicle at least one of location information, vehicle communication information, and vehicle platooning information. Subsequently, the management server may using a sensor of a vehicle adjacent to the above vehicle which is possibly performs the function of the first sensor in place of the defective first sensor. In other words, the management server may accept the request for transmitting the sensing data, and the vehicle that has been accepted the request may transmit sensing data to the vehicle including the first sensor by sensing data.

In other words, on the basis of FIGS. 6A-6C, when a specific sensor of a specific vehicle malfunctions, in order to use another sensor of an adjacent vehicle, information of the adjacent vehicle and sensor information of the adjacent vehicle may be delivered. Based on the same, whether or not the adjacent vehicle uses another sensor may be determined, and FIGS. 7A and 7B are views showing examples of the same.

Figure 7C:
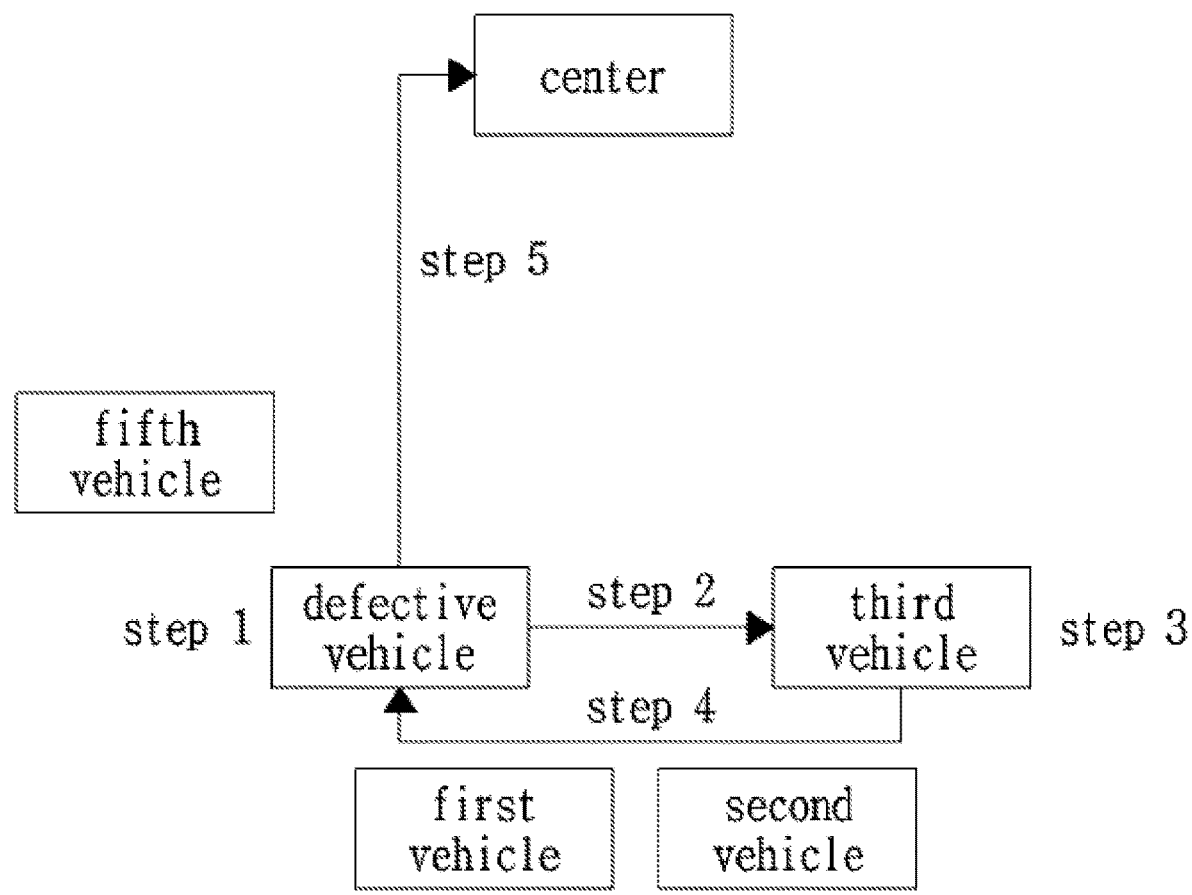

In addition, referring to FIG. 7C, a defective vehicle may detect that a forward sensor malfunctions (step 1). Herein, the defective vehicle may determine that a backward sensor of a third vehicle is usable in place of the forward sensor by searching adjacent vehicles, and transmit a request for information of the backward sensor to the third vehicle (step 2). Herein, the third vehicle transmits a reply after evaluating an available bandwidth and data rate (step 3). The function of the forward sensor of the defective vehicle may be performed by the backward sensor of the third vehicle through agreement between the defective vehicle and the third vehicle (step 4). Subsequently, the defective vehicle may transmit the entire sensor information necessary for the center (step 5). The entire sensor information may include a sensor state of the defective vehicle and information related replacing with the backward sensor of the third vehicle. Herein, another configuration of FIG. 7D may be similar to FIG. 7B. However, when a first sensor malfunctions, a device layer may request for a data transmission to another vehicle on the basis of a sensor management capability. In other words, a data transmission request is directly performed to a vehicle including a sensor possibly performing the function of the first sensor, and a reply for the same may be received. Subsequently, the vehicle including the first sensor may receive sensing data measured from a sensor of another vehicle. Herein, the vehicle including the first sensor may transmit to a management server at least one of failure information of the first sensor, adjacent vehicle information, and adjacent vehicle sensing information. In other words, whether or not to receive sensing information from an adjacent vehicle may be directly determined, and information for the same may be transmitted to the management server. Herein, a device layer of the management server may deliver information to an analysis system so as to update sensor information, and the available vehicle analysis system may process the information, and update a sensor database of the available vehicle.

Figure 7D:
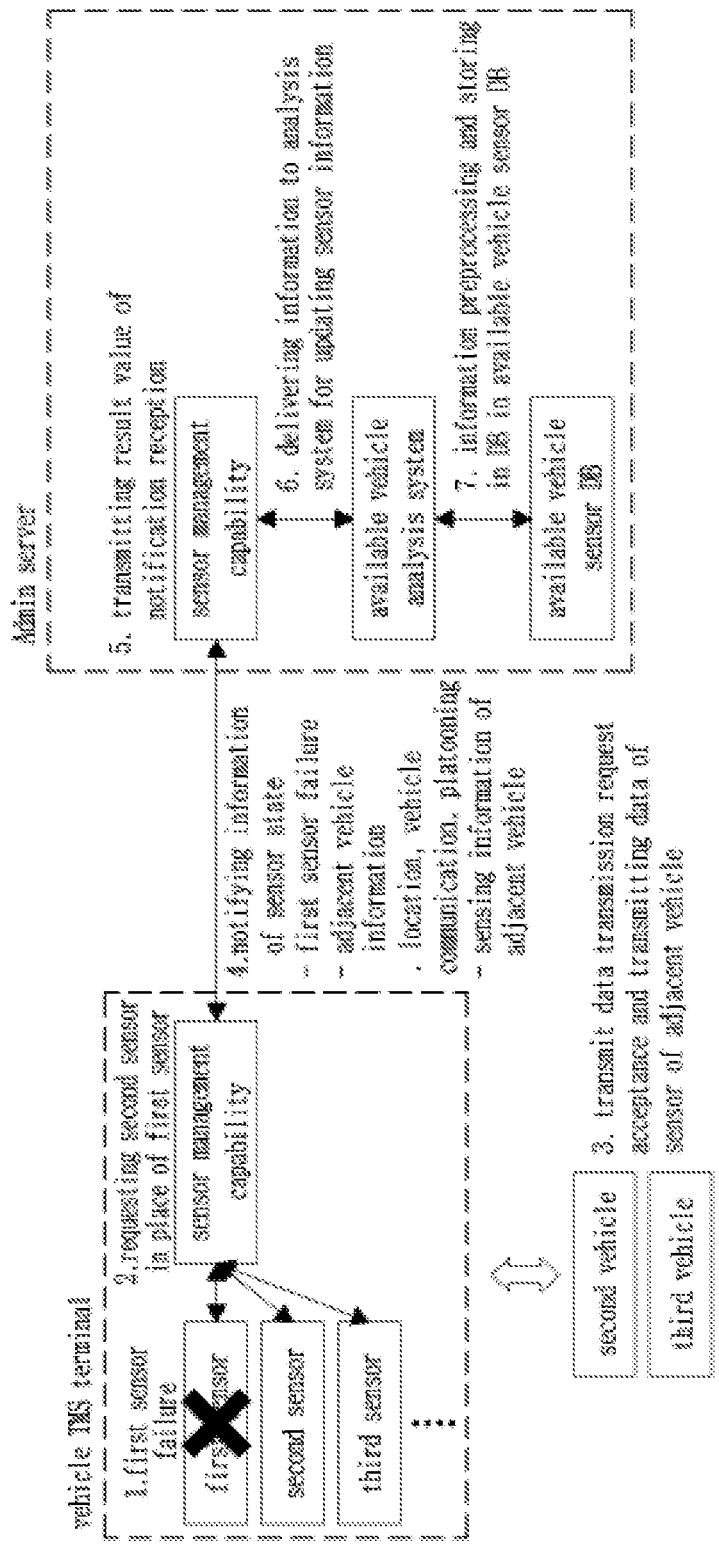

In other words, different to FIG. 7B, in FIG. 7D, whether or not a usable sensor is present may be determined through direct communication between a vehicle and an adjacent vehicle, and request for related information may be transmitted to a server on the basis of the same. However, it is not limited to the above-described embodiment.

Figure 8:
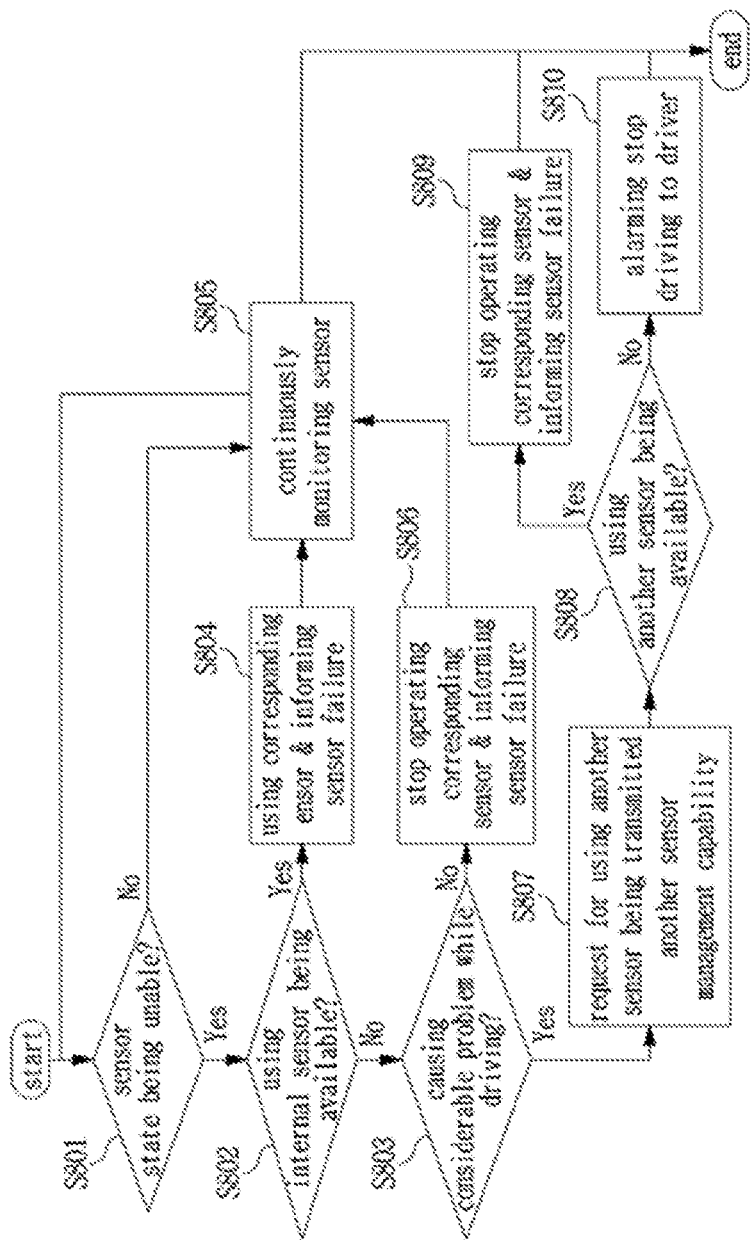
FIG. 8 is a view showing a method of using a sensor of another vehicle.

FIG. 8 is a view showing a method of using a sensor of another vehicle.

Referring to FIG. 8, a vehicle may determine whether or not a specific sensor malfunctions. In other words, in S801, whether or not a state of the specific sensor is unable.

Herein, when the sensor is in a normal state, and in S805, sensor monitoring may be continuously performed as described above. However, when the sensor is in an unable state, in S802, whether or not a usable sensor is present within the vehicle may be determined. Herein, when the usable sensor is present, in S803, replacing with the corresponding sensor may be performed and sensor failure information may be reported. In an example, a device layer of the vehicle may provide to a service support and application support layer information of using another sensor and failure information. Subsequently, in S805, sensor monitoring may be continued. Subsequently, in S803, when using an internal sensor is not available, whether or not the sensor failure causes a considerable problem while driving may be determined. Herein, whether or not the sensor failure causes a considerable problem while driving may be determined on the basis of a preset method. In an example, parameter values may be calculated, and whether or not a considerable problem occurs may be determined on the basis of the values. Herein, when a considerable problem does not occur while driving, in S806, the corresponding sensor may stop operating and an alarm of the sensor failure may be provided. In other words, for a case where a considerable problem does not occur while driving, driving may be kept and information of the sensor failure may be reported since the failure is irrelevant to safety. Subsequently, continuous monitoring for the sensor may be performed. Meanwhile, when a considerable problem occurs while driving, in S807, a request for performing the function of the corresponding sensor may be transmitted to another sensor management capability. Herein, the another sensor management capability may be a sensor management capability of an adjacent vehicle as described above. In addition, in an example, it may be a sensor management capability of a management server, and this is as described above. Subsequently, when a reply that performing the function of the failed sensor is available is received from a sensor management capability of the adjacent vehicle or management server in S808, in S809, the corresponding sensor may stop operating, and sensor failure information may be reported. Subsequently, sensing data sensed from another sensor may be received, and in S805, monitoring for the same may be performed. Meanwhile, when performing the function of the failed sensor is not available in S808, in S810, an alert for stopping driving may be reported to a user. In other words, an alert may be provided when replacing the sensor is not available for critical safety-related problem.

Meanwhile, as described above, whether or not a usable sensor is present within a vehicle may be determined before transmitting a request for performing a function of a malfunctioning sensor to an adjacent vehicle or management server, but it is not limited to the above-described embodiment.

Figure 9:
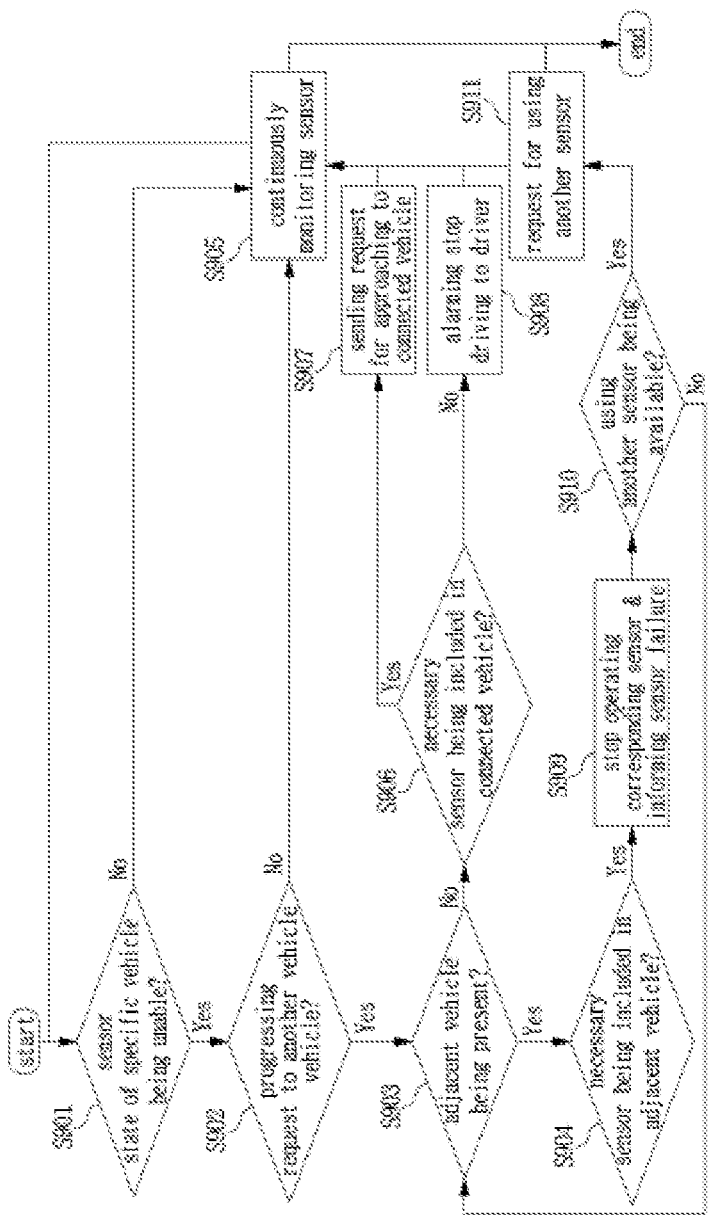
FIG. 9 is a view showing a method of enabling a function of a malfunctioning sensor to be taken over by a sensor of another vehicle.

FIG. 9 is a view showing a method of transmitting a request for performing a function of a malfunctioning sensor to a sensor to another vehicle. Referring to FIG. 9, in S901, whether or not a state of a sensor of a specific vehicle is unable may be determined. Herein, when the sensor operates normally, in S905, sensor monitoring may be continuously performed, and this is the same as FIG. 8. Subsequently, when a state of the specific state is unable, in S902, whether or not to progress a request to another vehicle may be determined. Herein, when it is determined not to progress a request, in S905, sensor monitoring may be continuously performed. Meanwhile, when it is determined not to progress a request, in S903, whether or not an adjacent vehicle is present may be determined. Herein, when an adjacent vehicle is not present, in S906, whether or not a necessary sensor is present among connected vehicles may be determined. In other words, whether or not a sensor replaceable with the failed sensor is present in connected vehicles may be determined even though the vehicles are not adjacent Herein, in S907, when a necessary sensor is present in the connected vehicle, an approach request may be transmitted to the connected vehicle. Accordingly, the function of failed sensor may be performed by the sensor of the connected vehicle when the connected vehicle approaches. However, when a necessary sensor is not present among connected vehicles, in S908, an alert for stopping driving may be provided to a driver. Subsequently, in sensor S905, sensor monitoring may be continuously performed.

In addition, when an adjacent vehicle is present in the above, in S904, whether or not a necessary sensor is included in an adjacent vehicle may be determined. In other words, whether or not the adjacent vehicle includes a sensor that possibly performs the function of the failed sensor may be determined. Herein, when a necessary sensor is not present in the adjacent vehicle, an alert for stopping driving may be transmitted to the driver. However, when a necessary sensor is included in the adjacent vehicle, in S909, the corresponding sensor may stop operating, and the sensor failure may be reported. Subsequently, in S910, a request whether or not performing the function of the failed sensor is available is transmitted to the adjacent vehicle on the basis of a necessary sensor, and a reply for the same may be received. Herein, when performing the function of the failed sensor is available, in S911, a message requesting for performing the function may be transmitted to the corresponding sensor, and receive data sensed by the corresponding sensor by receiving a reply for the same. However, when a reply that replacing is available is not received, searching for another adjacent vehicle may be performed, but it is not limited to the above-described embodiment.

Figure 10:
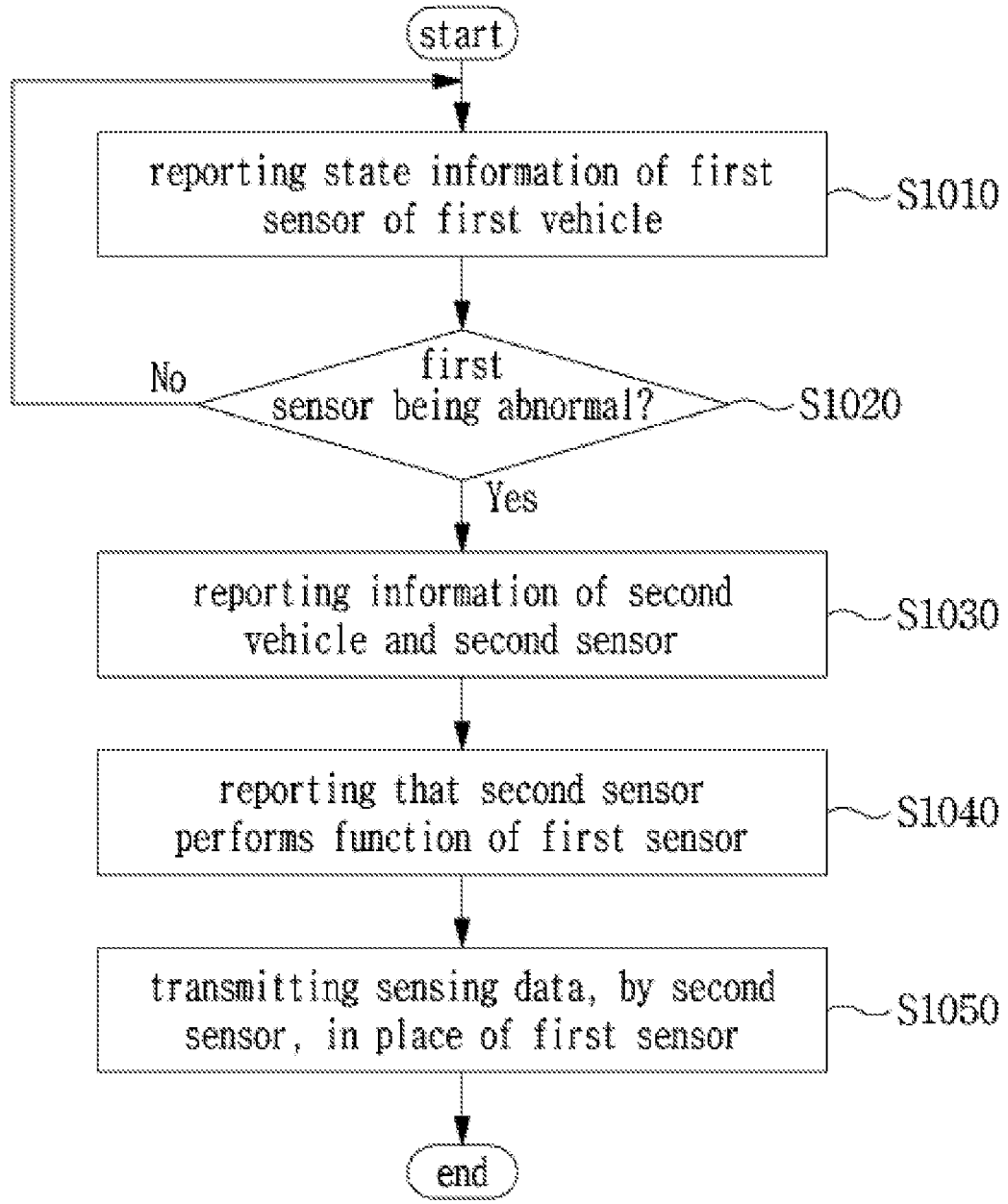
FIG. 10 is a view of a flowchart showing a countermeasure for a case of a sensor failure according to an embodiment of the present invention.

FIG. 10 is a view of a flowchart showing a countermeasure for a case of a sensor failure according to an embodiment of the present invention.

Referring to FIG. 10, in S1010, state information of a first sensor of a first vehicle may be reported. Herein, as described with FIGS. 1 to 9, a device layer of the first vehicle may detect a sensor operation, create a control message so as to manage the sensor, and report the same to a service support and application support layer of the first vehicle. Herein, reporting sensor state information may be performed on the basis of a sensor management capability of the device layer, and this is as described above.

Subsequently, in S1020, whether or not the first sensor is abnormal may be determined. Herein, as described with FIGS. 1 to 9, whether or not the first sensor is abnormal may be determined by determining whether or not the first sensor malfunctions due to a failure. In addition, in an example, it may be a case where a specific information value sensed by the first sensor is equal to or smaller than a threshold value. In other words, when the first sensor malfunctions on the basis of a predetermined reference value, the first sensor may be determined to be abnormal. Herein, in an example, when the first sensor is abnormal, a device layer may periodically report state information of the first sensor to a service support and application support layer. In other words, the first sensor may operate in the same manner as before. However, when the first sensor is abnormal, in S1030, information of a second vehicle and a second sensor may be reported. Herein, as described with FIGS. 1 to 9, when the first sensor is abnormal, the second vehicle and the second sensor of the second vehicle may be recommended. Herein, in an example, on the basis of FIGS. 7A to 7D described above, information of the second vehicle may be obtained as an adjacent vehicle. In addition, information of the second sensor that possibly performs the function of the first sensor may be obtained, and this is the same as FIGS. 7A to 7D. Subsequently, a device layer may report to a service support and application support layer information of the second vehicle and the second sensor.

Subsequently, when the second sensor performs the function of the first sensor, in S1040, information indicating that the second sensor performs the function of the first sensor may be transmitted. Herein, as described with FIGS. 1 to 9, a device layer of the first vehicle may report to a service support and application support layer that the second sensor performs the function of the first sensor. Subsequently, in S1050, the second sensor may transmit sensing data in place of the first sensor. Herein, the second sensor is a sensor included in the second vehicle adjacent to the first vehicle, and thus information sensed by second sensor may be transmitted on the basis of communication between the first vehicle and the second vehicle, but it is not limited to the above-described embodiment.

Figure 11:
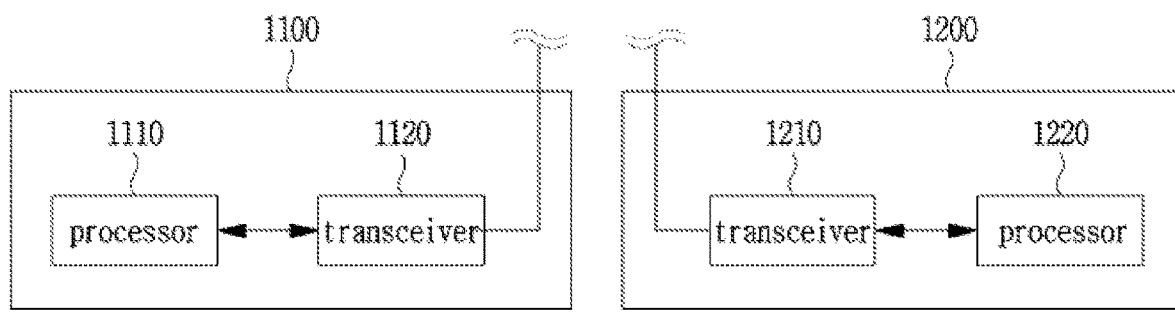
FIG. 11 is a view showing a configuration of a terminal device according to an embodiment of the present invention.

FIG. 11 is a view showing a configuration of another device according to the present invention.

In an example, a device in the present invention may be an M2M terminal device. In addition, a device in the present invention may be a vehicle or other movable object. In other words, a device operating by using IoT may be a device of the present invention, but it is not limited to the above-described embodiment. Hereinafter, it is referred as an M2M terminal device for convenience of description.

An M2M terminal device 1100 may include a processor 1110 controlling the device and a transceiver 1120 transmitting and receiving a wireless signal. Herein, the processor 1110 may control the transceiver 1120. In addition, the M2M terminal device 1100 may perform communication with another M2M terminal device 1100. In an example, each of the above-described transmitter and receiver may be an M2M terminal of FIG. 11. Another M2M terminal device 1200 may also include a processor 1210 and a transceiver 1220, and the processor 1210 and the transceiver 1220 may perform the same function. In addition, a device of FIG. 11 may be another device. In an example, it may be a device such as a device, a vehicle or a base station which performs communication. In other words, it may refer to a device possibly performing communication, but it is not limited to the above-described embodiment.

The above-described embodiments of the present invention can be implemented by various means. In an example, various embodiments of the present invention may be implemented in hardware, firmware, software, or a combination thereof.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. In addition, although the preferred embodiments of the present invention have been illustrated and described, those skilled in the art will appreciate that the present invention should not be limited to the above specific embodiments and various modifications thereof are possible without departing from the scope and spirit of the invention as disclosed in the accompanying claims and these modifications should not be understood independently of the technical idea of the present invention.

And, both an apparatus invention and a method invention are explained in the present specification and the explanation on both of the inventions can be complementally applied, if necessary.

In addition, while several exemplary embodiments have been particularly shown and described. It will be understood by those skilled in the art that various changes in form and details may be made therein without departing from the spirit and scope of the invention as defined by the appended claims. Therefore, the disclosed embodiments should be considered in an illustrative rather than a restrictive sense. The scope of the invention is defined not by the detailed description but by the appended claims, and all differences within the scope will be construed as being included in the present invention.

What is claimed is:

1. A method of managing a sensor in a first vehicle, the method comprising:
    monitoring, by the first vehicle, state information of a first sensor of the first vehicle;
    reporting, by the first vehicle, failure information of the first sensor and information of a second vehicle to a management server when the first sensor is abnormal, wherein the second vehicle is adjacent to the first vehicle;
    determining, by the management server, whether or not a second sensor located in the second vehicle substitutes for the first sensor;
    requesting, by the management server, sensing data of the second sensor to the second vehicle when the management server determines that the second sensor substitutes for the first sensor; and
    transmitting, by the second vehicle, the sensing data of the second sensor to the management server.

2. The method of claim 1, wherein when the first sensor malfunctions, or a value measured by the first sensor is equal to or smaller than a threshold value, the first sensor is determined to be abnormal.

3. The method of claim 1, wherein the second vehicle includes a capability of performing vehicle-to-vehicle (V2V) communication with the first vehicle.

4. The method of claim 1, wherein the first vehicle exchanges at least one of the state information of the first sensor, adjacent vehicle information, and adjacent sensor information with the management server, and the management server determines whether or not the second sensor substitutes for the first sensor on the basis of the exchanged information.

5. A management server managing a sensor, the management server comprising:
    a transceiver transmitting and receiving a signal; and
    a processor controlling the transceiver, wherein the processor:
        receives failure information of a first sensor and information of a second vehicle from a first vehicle when the first vehicle determines that the first sensor is abnormal, wherein the second vehicle is adjacent to the first vehicle;
        determines whether or not a second sensor located in the second vehicle substitutes for the first sensor;
        requests sensing data of the second sensor to the second vehicle when the management server determines that the second sensor substitutes for the first sensor; and
        receives the sensing data of the second sensor from the second vehicle.

6. The management server of claim 5, wherein the first vehicle exchanges at least one of state information of the first sensor, adjacent vehicle information, and adjacent sensor information with the management server, and the management server determines whether or not the second sensor substitutes for the first sensor on the basis of the exchanged information.

7. A method of managing a sensor of a first vehicle by a management server, the method comprising:
    receiving, by the management server, failure information of a first sensor and information of a second vehicle from the first vehicle when the first vehicle determines that the first sensor is abnormal, wherein the second vehicle is adjacent to the first vehicle;
    determining, by the management server, whether or not a second sensor located in the second vehicle substitutes for the first sensor;
    requesting, by the management server, sensing data of the second sensor to the second vehicle when the management server determines that the second sensor substitutes for the first sensor; and
    receiving, by the management server, the sensing data of the second sensor from the second vehicle.

* * * * *